US007562166B2

(12) United States Patent
Oshita et al.

(10) Patent No.: US 7,562,166 B2
(45) Date of Patent: Jul. 14, 2009

(54) DATA TRANSFER CONTROL DEVICE WITH STATE TRANSITION CONTROL AND ELECTRONIC EQUIPMENT

(75) Inventors: Shun Oshita, Sapporo (JP); Kenyou Nagao, Sapporo (JP); Shuichi Yanagihara, Sapporo (JP); Yuji Mikami, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 357 days.

(21) Appl. No.: 11/340,766

(22) Filed: Jan. 27, 2006

(65) Prior Publication Data

US 2006/0190665 A1    Aug. 24, 2006

(30) Foreign Application Priority Data

Feb. 18, 2005    (JP)    ............................. 2005-042118

(51) Int. Cl.
G06F 13/00    (2006.01)
(52) U.S. Cl. ....................................................... 710/33
(58) Field of Classification Search .................. 710/33; 719/318; 326/46
See application file for complete search history.

(56) References Cited

U.S. PATENT DOCUMENTS 5,838,931 A * 11/1998 Regenold et al. ............ 710/306
5,884,095 A *  3/1999 Wolford et al. ............... 710/25
7,272,665 B2    9/2007 Yamada et al.

(Continued)

FOREIGN PATENT DOCUMENTS

JP    A-3-260857    11/1991

(Continued)

OTHER PUBLICATIONS

Definition of 'macro instruction', 1998, Wiley Dictionary of Communications Technology.*

(Continued)

Primary Examiner—Henry W. H. Tsai
Assistant Examiner—Hyun Nam
(74) Attorney, Agent, or Firm—Oliff & Berridge, PLC

(57) ABSTRACT

A data transfer control device for data transfer through a bus including a state execution circuit conducting each state process of first-Nth states in order to perform a state control of the data transfer control device, a transfer controller performing a control for the data transfer based on a result of the state process execution in the state execution circuit, a command register in which a state transition execution command is set, and a control circuit decoding the state transition execution command set in the command register and controlling the state execution circuit based on a result of the decoding, the control circuit controlling the state execution circuit to execute a Kth ($1 \leq K \leq N$) state process if an individual state transition execution command that changes the state of the data transfer control device to the Kth state is set in the command register, and the control circuit controlling the state execution circuit to execute a plurality of state processes consecutively from a Lth ($1 \leq L \leq N$) state to a Mth ($1 \leq M \leq N$) state if a successive transition execution command is set in the command register, the successive transition execution command successively changing the state of the data transfer control device from the Lth state to the Mth state.

13 Claims, 17 Drawing Sheets

U.S. PATENT DOCUMENTS

2002/0169905 A1* 11/2002 Ishida et al. .............. 710/100
2003/0204652 A1   10/2003 Saito et al.
2003/0236932 A1* 12/2003 Saito et al. ................ 710/52
2007/0083491 A1*  4/2007 Walmsley et al. ........... 707/3
2007/0266184 A1   11/2007 Yamada et al.

FOREIGN PATENT DOCUMENTS

| JP | A 2002-55936 | 2/2002 |
| JP | A 2003-323395 | 11/2003 |
| JP | A 2003-323396 | 11/2003 |
| JP | A-2004-326342 | 11/2004 |

OTHER PUBLICATIONS

Definition of 'macro', 1999, John Wiley & Sons Ltd, Dictionary of Multimedia and Internet Application.*

* cited by examiner

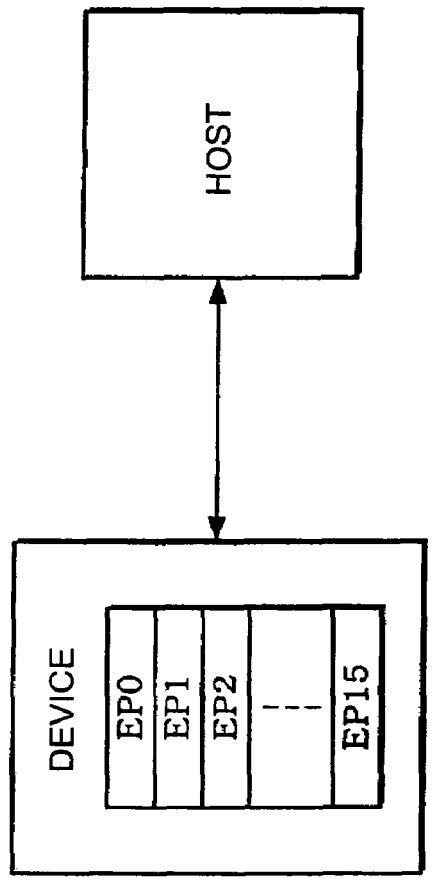
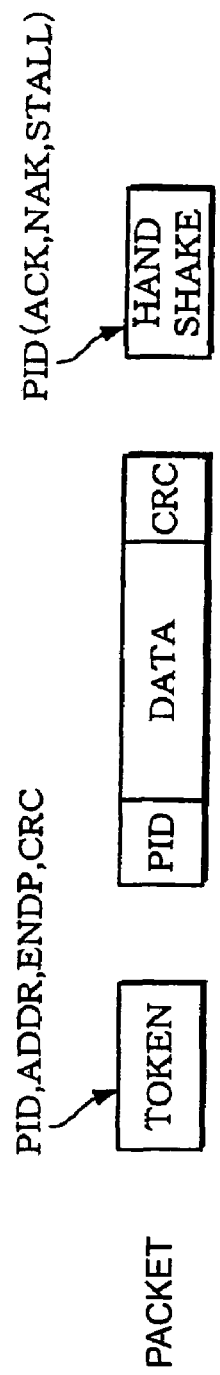
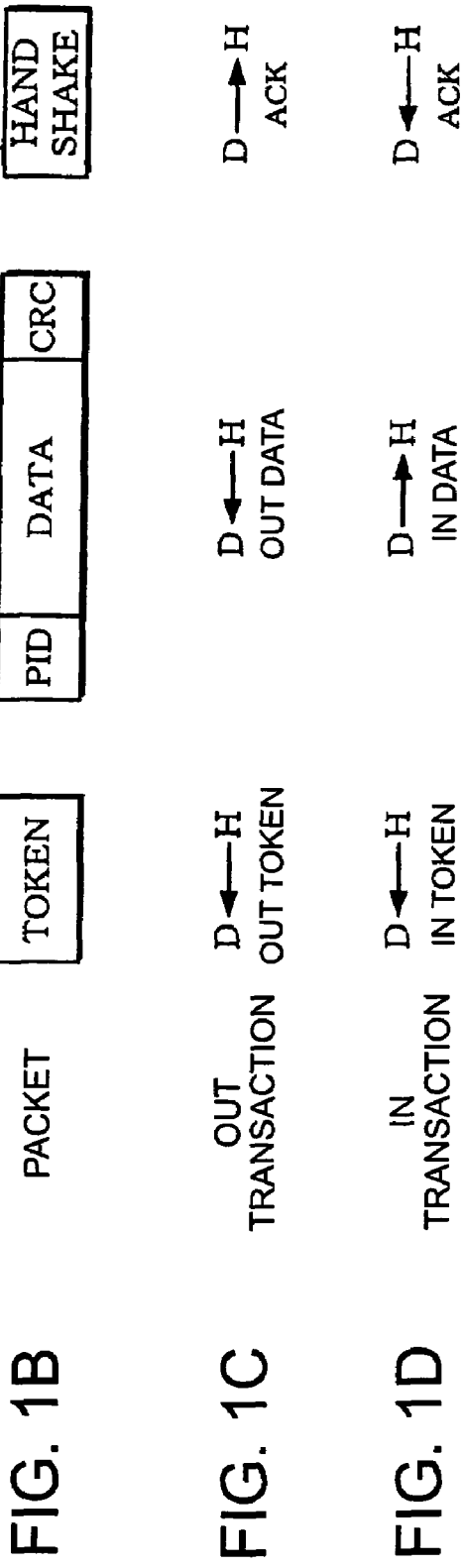
FIG. 1A
FIG. 1B
FIG. 1C
FIG. 1D

| REGISTER | FUNCTION |
|---|---|
| STATE TRANSITION EXECUTION COMMAND | SET STATE TRANSITION EXECUTION COMMAND (GoIDILE,GoWAIT_CONNECT,GoRESET,GoOPERATIONAL, GoSUSPEND,GoRESUME,GoWAIT_CONNECTtoOP, GoRESETtoOP,GoRESUMEtoOP,GoSUSPENDtoOP) |
| STATE TRANSITION EXECUTION CANCEL | CANCEL STATE TRANSITION EXECUTION COMMAND (AutoCancel) |
| STATE MONITOR | SHOW CURRENT STATE (HostState) |
| VBUS STATE MONITOR | INDICATE VBUS STATE (NORMAL/ABNORMAL) (VBUS_State) |
| REMOTE WAKEUP RECEIVE PERMIT | PERMIT TO RECEIVE REMOTE WAKEUP (RmtWkupDetEnb) |
| VBUS ERROR DETECTION STATUS | INDICATE VBUS ERROR OCCURRED (VBUS_Err) |
| CONNECTION DETECTION STATUS | INDICATE DEVICE IS COUPLED TO DOWNSTREAM PORT (DetectCon) |
| DISCONNECTION DETECTION STATUS | INDICATE DEVICE IS DISCONNECTED FROM DOWNSTREAM PORT (DetectDisCon) |
| REMOTE WAKEUP DETECTION STATUS | INDICATE REMOTE WAKEUP SIGNAL FROM DEVICE IS DETECTED (DetectRmtWkup) |
| DEVICE CHIRP NORMAL DETECTION STATUS | INDICATE CHIRP SIGNAL FROM DEVICE IS NORMAL (DetectDevChirpOK) |
| DEVICE CHIRP ERROR DETECTION STATUS | INDICATE CHIRP SIGNAL FROM DEVICE IS ABNORMAL (DetectDevChirpNG) |
| RESET COMPLETE STATUS | INDICATE USB RESET IS SUCCESSFULLY COMPLETED (ResetCmp) |
| SUSPEND TRANSITION COMPLETE STATUS | INDICATE TRANSITION TO SUSPEND IS COMPLETED (SuspendCmp) |
| RESUME COMPLETE STATUS | INDICATE RESUME IS SUCCESSFULLY COMPLETED (ResumeCmp) |
| PORT SPEED | SHOW OPERATION SPEED (HS, FS, LS) OF DOWNSTREAM PORT (PortSpeed) |
| LINE STATE | SHOW SIGNAL STATUS OF USB CABLE (LineState) |
| TRANSCEIVER SELECT | ENABLE TRANSCEIVER BY SELECTING ONE OF HS/FS/LS (XcvrSelect) |
| TERMINAL SELECT | ENABLE TERMINAL BY SELECTING ONE OF HS/FS/LS (TermSelect) |
| OPERATION MODE | SET OPERATION MODE OF TRANSCEIVER (OpMode) |

FIG. 6

DATA TRANSFER CONTROL DEVICE WITH STATE TRANSITION CONTROL AND ELECTRONIC EQUIPMENT

BACKGROUND OF THE INVENTION

1. Technical Field

The present invention relates to a data transfer control device and electronic equipment.

2. Related Art

In recent years, there has been a strong demand for peripheral equipment with a universal serial bus (USB) function such as cellular phones and mobile audio devices. JP-A-2002-55936 is an example of related art. The example describes a hitherto known technique of the data transfer control device realizing the host function of the peripheral equipment. In addition to the example, there is USB On-The-Go (OTG) standard as such technique.

When the data transfer control device embedded with the peripheral equipment performs the host function, the data transfer control device has to conduct a state control as a host.

However, in the state control of the host, so many kinds of states exist, and complicated processes to control or detect a line state corresponding to each state are required. This causes a problem of increase in the size of circuits and a problem of complex design when hardware tries to perform all the state control.

Meanwhile, when firmware (software) that a central processing unit (CPU) runs on tries to perform all the state control, the firmware has to control and detect all the line states corresponding to each state. This causes a problem that designing of the firmware becomes complex and the state control process will not finish within a predetermined time period. Furthermore, the CPU embedded with the peripheral equipment generally has a low processing capacity compared to that of the CPU embedded with a personal computer (PC). Therefore, when the firmware tries to process all the state control, processing load of the CPU increases and this leads to a problem such that speeding up of the data transfer is impaired and the performance of the whole equipment is deteriorated.

SUMMARY

An advantage of the invention is to provide a data transfer control device that can realize effective control of the state transition and electronic equipment thereof.

According to a first aspect of the invention, a data transfer control device for data transfer through a bus includes a state execution circuit conducting each state process of first-Nth states in order to perform a state control of the data transfer control device, a transfer controller performing a control for the data transfer based on a result of the state process execution in the state execution circuit, a command register in which a state transition execution command is set, and a control circuit decoding the state transition execution command set in the command register and controlling the state execution circuit based on a result of the decoding. The control circuit controles the state execution circuit to execute a Kth ($1 \leq K \leq N$) state process if an individual state transition execution command that changes the state of the data transfer control device to the Kth state is set in the command register. The control circuit controls the state execution circuit to execute a plurality of state processes consecutively from a Lth ($1 \leq L \leq N$) state to a Mth ($1 \leq M \leq N$) state if a successive transition execution command is set in the command register, and the successive transition execution command successively changes the state of the data transfer control device from the Lth state to the Mth state.

According to the first aspect of the invention, the state transition execution command is set in the command register. If the individual state transition execution command is set in the command register, the Kth state process is individually executed. On the other hand, if the successive transition execution command is set in the command register, the plurality of the state processes from the Lth ($1 \leq L \leq N$) state to the Mth ($1 \leq M \leq N$) state is consecutively executed. Thereby, each state process can be automatically conducted only by setting the state transition execution command in the command register by a processing unit (firmware) and the like. Accordingly, it is possible to realize an effective data transfer control. Moreover, the plurality of the state processes can be successively and automatically conducted by using the successive transition execution command. Therefore, the processing unit and the like does not have to set a plurality of the individual state transition execution commands so that the processing load of the processing unit can be reduced.

In this case, the state execution circuit may include first-Nth state sequencers executing the first-Nth state processes, and the control circuit may output an activating signal to start executing the state process to a Kth state sequencer if the individual state transition execution command is set in the command register, the Kth state sequencer conducts the Kth state process. The control circuit sequentially outputs the activating signal to each of Lth-Mth state sequencers in order to start the state process if the successive state transition execution command is set in the command register, and the Lth-Mth state sequencers respectively conduct the Lth-Mth state processes. The control circuit may receive a completion signal of the state process execution from each state sequencer.

In this way, the state process by the individual state transition can be realized by using the state sequencers that can conduct each state process independently. In addition, the state process by the successive state transition can also be realized by using the activating signal and the completion signal. Therefore, the state process by both the individual state transition and the successive state transition can be easily realized.

The data transfer control device may further include an interrupt signal generation circuit generating an interrupt signal to a processing unit that sets the state transition execution command in the command register. The interrupt signal generation circuit receives the completion signal from each state sequencer and generates the interrupt signal based on the completion signal.

In this way, the completion of each state can be notified to the processing unit through the completion signal of the state process at the time of the state process by the individual state transition. At the time of the state process by the successive state transition, the control circuit uses the interrupt signal to start the next state process to the completed state process. Therefore, it is possible to utilize the interrupt signal.

In this case, the successive state transition execution command may include at least one of a first command that successively changes the state starting from a wait connect state to an operational state through a reset state and a second command that successively changes the state starting from the reset state to the operational state.

In this way, the data transfer can be started by automatically changing the state into the operational state from the wait connect state or the reset state. Accordingly, it is possible to perform the data transfer control more efficiently.

Furthermore, the control circuit may output the activating signal of the operational state process execution to the state execution circuit if the control circuit receives the completion signal of the reset state process execution from the state execution circuit.

In this way, the processing unit does not have to administrate the time period from when the reset state process is completed to when the data transfer in the operational state starts. Therefore, the processing load can be reduced.

Moreover, the successive state transition execution command may include at least one of a third command that successively changes the state starting from a suspend state to an operational state through a resume state and a forth command that successively changes the state starting from the resume state to the operational state.

In this way, the data transfer can be started by automatically changing the state into the operational state from the suspend state or the resume state. Accordingly, it is possible to perform the data transfer control more efficiently.

In this case, the control circuit may output the activating signal of the operational state process execution to the state execution circuit if the control circuit receives the completion signal of the resume state process execution from the state execution circuit.

In this way, the processing unit does not have to administrate the time period from when the resume state process is completed to when the data transfer in the operational state starts. Therefore, the processing load can be reduced.

According to a second aspect of the invention, a data transfer control device for data transfer through a bus includes a state execution circuit conducting each state process of first-Nth states in order to perform a state control of the data transfer control device, a transfer controller performing a control for the data transfer based on a result of the state process execution in the state execution circuit, a command register in which a state transition execution command is set and a control circuit decoding the state transition execution command set in the command register and controlling the state execution circuit based on a result of the decoding. The control circuit controls the state execution circuit to execute a Kth ($1 \leq K \leq N$) state process if an individual state transition execution command that changes the state of the data transfer control device to the Kth state is set in the command register.

According to the second aspect, each state process can be automatically executed only by setting the individual state transition execution command by the processing unit and the like. Therefore, it is possible to realize an effective data transfer control.

According to a third aspect of the invention, a data transfer control device for data transfer through a bus includes a state execution circuit conducting each state process of first-Nth states in order to perform a state control of the data transfer control device, a transfer controller performing a control for the data transfer based on a result of the state process execution in the state execution circuit, a command register in which a state transition execution command is set and a control circuit decoding the state transition execution command set in the command register and controlling the state execution circuit based on a result of the decoding. The control circuit controls the state execution circuit to execute a plurality of state processes consecutively from a Lth ($1 \leq L \leq N$) state to a Mth ($1 \leq M \leq N$) state if a successive transition execution command is set in the command register, and the successive transition execution command successively changes the state of the data transfer control device from the Lth state to the Mth state.

According to the third aspect, the plurality of the state processes can be automatically and successively executed only by setting the successive state transition execution command by the processing unit and the like. Therefore, it is possible to realize an effective data transfer control.

Moreover, the data transfer control device may further include a line state detection circuit detecting a line state of a data line of the bus. The line state detection circuit includes a plurality of detection circuits, the state execution circuit enables a detection circuit that should be operated for the detection among the plurality of the detection circuits, and outputs a signal that disables an unrequited detection circuit to the line state detection circuit.

In this way, each detection circuit can be operated at an appropriate timing in each state, and it can prevent malfunction and the like from occurring.

Furthermore, the transfer controller may include a transaction execution circuit executing a transaction process, the transaction execution circuit receives a transaction execution activating signal from the state execution circuit and starts to execute the transaction process according to the transaction execution activating signal.

In this way, the transaction of the data transfer can be automatically conducted based on the activating signal from the transaction execution circuit. Accordingly, it is possible to perform the data transfer control more efficiently.

The data transfer control device may further include a line state control circuit controlling a line state of a data line of the bus, the line state control circuit receives a line state control signal from the state execution circuit and controls the line state based on the line state control signal.

In this way, the processing unit does not have to perform many controls to the line state of the bus. Therefore, its processing load can be reduced.

The data transfer control device may conduct data transfer through a universal serial bus (USB).

According to a forth aspect of the invention, electronic equipment includes the above-mentioned data transfer control device and a storage storing data that is transferred by the data transfer control device.

BRIEF DESCRIPTION OF THE DRAWINGS

The invention will be described with reference to the accompanying drawings, wherein like numbers reference like elements.

FIGS. 1A through 1D are explanation drawings of USB data transfer.

FIG. 6 is an explanatory diagram of a register and its function used in the embodiment.

DESCRIPTION OF THE EMBODIMENTS

Note that the embodiments described hereunder do not in any way limit the scope of the invention defined by the claims laid out herein. Note also that all of the elements of these embodiments should not be taken as essential requirements to the means of the invention.

1. USB

Firstly, a data transfer of USB is described. In the USB, end points (EP0-15) are provided in a device (USB device) side as shown in FIG. 1A. A host can discretionally send data to a desired end point and receive data from a desired end point by specifying a function address and an endpoint number of the device.

As transfer types in the USB, a control transfer, an isochronous transfer, an interrupt transfer, a bulk transfer and the like are defined. Every transfer consists of a series of transactions. Each transaction consists of a token packet, a data packet which is optional and a hand shake packet which is also optional as shown in FIG. 1B.

In OUT transaction (a transaction in which the host outputs data to the device), firstly, the host issues OUT token (a token packet) to the device as shown in FIG. 1C. The host then sends OUT data (a data packet) to the device. If the device successfully receives the OUT data, the device sends ACK (a handshake packet) to the host. In this way, the process in which the host outputs data to the device is performed.

Meanwhile, in IN transaction (a transaction in which data is inputted to the host from the device), firstly, the host issues IN token to the device as shown in FIG. 1D. The device that received the IN token sends IN data to the host. If the host successfully receives the IN data, the host send ACK to the device. In this way, the process in which data is inputted to the host from the device is performed.

In FIGS. 1C and 1D, "D←H" designates that data is transferred to the device from the host. On the contrary, "D→H" means that data is transferred to the host from the device.

2. State Transition

Figure 2:
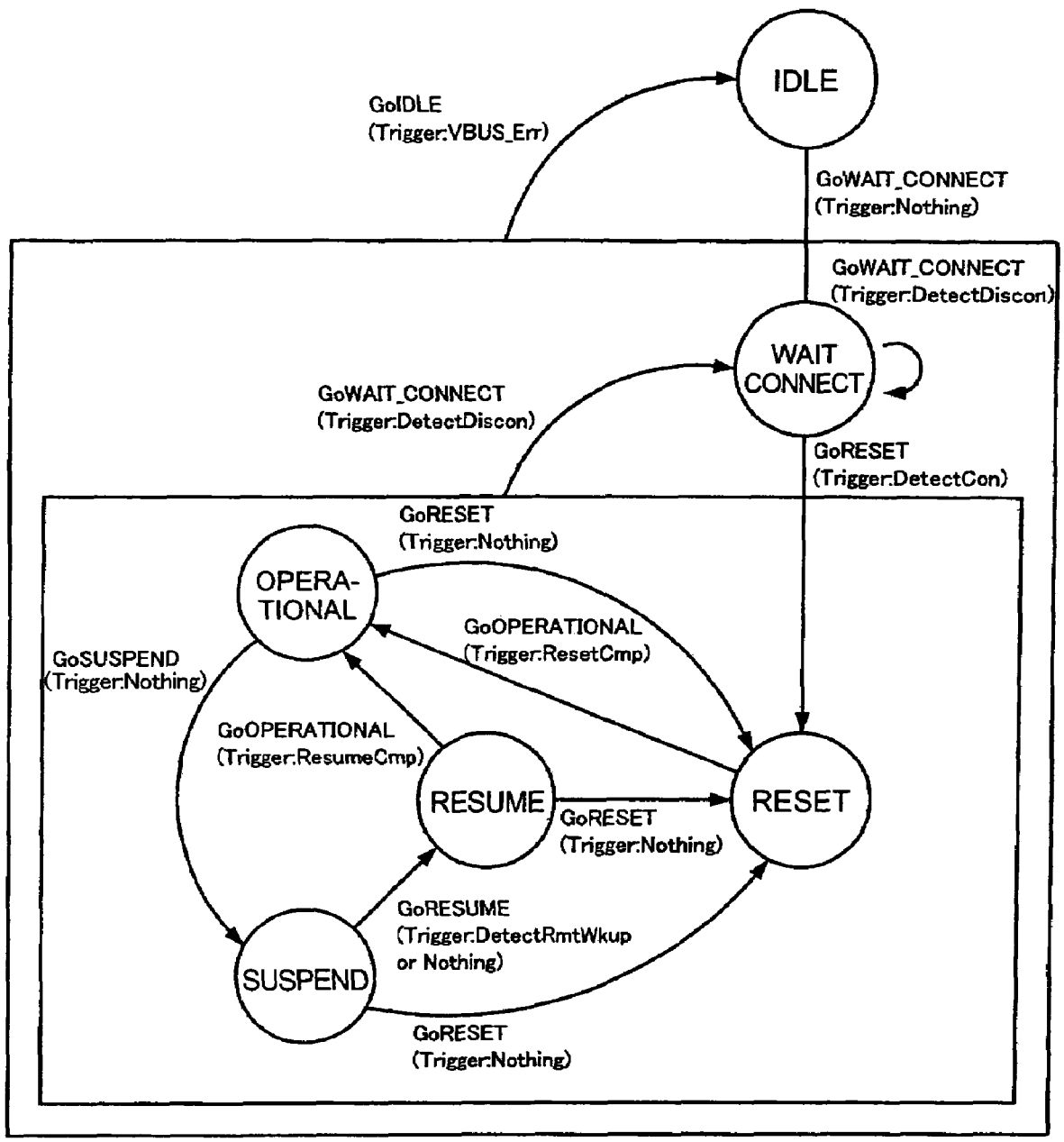
FIG. 2 is a state transition diagram of a data transfer control device according to an embodiment of the invention.

FIG. 2 is a state transition diagram of a data transfer control device according to this embodiment. In FIG. 2, an idle state is the state in which a host function of the USB (a bus or a serial bus in a broad sense) is initialized and is also a default state when the host function is enabled. If VBUS error (VBUS_Err) is detected in other states than the idle state, the state of the data transfer control device should be changed into the idle state.

A wait connect state is the state to wait for the device to be coupled a downstream port. When a transaction needs to be taken place in the idle state or a device disconnection is detected in a state, the current state is once changed into the wait connect state, waiting for the device to be coupled.

A reset state is the state in which USB reset is issued to the downstream port. When a connection detect state (Detect-Con) is issued in the wait connect state, the state is changed into the reset state and the USB reset is issued. If a higher level layer requests, any states (an operational, suspend and resume states) in the USB can be changed into the reset state.

An operational state is the state in which the transaction of the USB is carried out. After the reset state or the resume state is completed, the state is changed into the operational state and the transaction is conducted.

A suspend state is the state for suspending the USB. When the use of the bus of the USB is stopped, the sate changes from the operational state into the suspend state.

A resume state is the state in which a resume signal of the USB is issued to the downstream port. The state is changed from the suspend state into the resume state in order to return the device coupled with the USB from the suspend state.

As described above with reference to FIGS. 1A through 1D, the host has control of data transfer in the USB. For this reason, the host has to conduct a state control that is shown in FIG. 2.

In this case, processing capacity of the CPU embedded with the PC is high. Therefore, it is possible for the firmware (software) to process all the state control shown in FIG. 2. However, the processing capacity of the CPU embedded with cellular phones and mobile audio devices is generally low. Accordingly, if the firm ware tries to process all the state control shown in FIG. 2, the processing load of the CPU increases and this leads to a problem such that speeding up of the data transfer is impaired and the performance of the whole equipment is deteriorated. On the other hand, if the hardware tries to process all the state control shown in FIG. 2, problems such as increase in the size of circuits and complex design will be occurred.

In order to solve the above-mentioned problems, this embodiment allocates roles between the firmware and the hardware as hereinafter described and realizes the state control shown in FIG. 2. To be more specific, the firmware (a processing unit) sets (issues) a state transition execution command in which a state is coded to a hardware circuit (register) in the data transfer control device. The hardware then automatically executes the state process. The hardware circuit notifies the completion of the firmware by interruption when the hardware circuit finishes the execution.

For example, if the firmware tries to process all the state control shown in FIG. 2, the firmware has to configure many settings for the state control. Therefore, the excessive processing load will be imposed to the firmware. Furthermore, for example, it is impossible for the firmware operated by a real-time operating system to process the transition or the control that is restricted in terms of time period as short as 1 msec.

According to the embodiment using the state transition execution command, the firmware does not need to consider the many settings of the state and the time restriction. Thereby, the processing load of the firmware (CPU) can be reduced, and the effective state control is realized.

3. Individual State Transition

The state transition execution command in the embodiment is the command that makes a state of the data transfer control device (transfer controller) change into the state defied by the state transition execution command. As the state transition execution command, an individual state transition execution command that transfers the state of the data transfer control device into a Kth ($1 \leq K \leq N$) state is provided in the embodiment. In the individual state transition execution command, the state of the data transfer control device is changed into the Kth state from other states than Kth state.

For example, when the firmware issues the individual state transition execution command "GoIDLE" in FIG. 2, the state of the data transfer control device is changed into the idle state (the Kth state in a broad sense). When the state goes into the idle state, the hardware circuit immediately stops a transaction execution function of the host. At the same time, the port is set to a full speed (FS) mode of the USB, setting into a non-drive status. The hardware circuit also turns off the VBUS (VBUSEN_A). The hardware circuit further turns off (disables) all the detection functions including connection detection, disconnection detection, remote wakeup detection and device chirp detection.

When the firmware issues the individual state transition execution command "GoWAIT_CONNECT", the state changes into the wait connect state. When the state goes to the wait connect state, the hardware circuit promptly halts the transaction execution function of the host. At the same time, the port is set to the FS mode of the USB, setting into a power down status. The hardware circuit turns on the VBUS (VBUSEN_A). Furthermore, the hardware turns off all the detection functions including connection detection, disconnection detection, remote wakeup detection and device chirp detection. After a certain time period in which an internal power supply of a bus power device is stabilized passes, the hardware circuit automatically turns on (enables) the connection detection function and waits for the device to be coupled. Once the connection is detected, the connection detection function is automatically turned off and the disconnection detection function is automatically turned on. If the disconnection is not detected for a predetermined period, a connection detection status (DetectCon) is issued to the firmware. If the disconnection is detected, a disconnection detection status (DetectDiscon) is issued to the firmware.

When the firmware issues the individual state transition execution command "GoRESET", the state changes into the reset state. When the state goes to the reset state, the hardware circuit promptly halts the transaction execution function of the host. At the same time, the port is set to a high speed (HS) mode of the USB, setting into a normal operation status. The hardware turns off the connection detection function, the disconnection detection function and the remote wakeup detection function, but turn on the device chirp detection function detecting the chirp from the device. If the normal chirp from the device is detected, "K" and "J" of the HS, which are the chirp of the host, are sequentially transmitted after the chirp from the device is completed. Following the transmission of the host chirp, a reset completion status (ResetCmp) is issued to the firmware. If the abnormal chirp is detected from the device, a device chirp abnormal detection status (DetectDevChirpNG) is issued to the firmware after a predetermined period passed.

When the firmware issues the individual state transition execution command "GoOPERATIONAL", the state changes into the operational state. When the state goes to the operational state, the hardware circuit sets the port to the normal operation status. The hardware circuit also turns on the transaction execution function of the USB host and the disconnection detection function.

When the firmware issues the individual state transition execution command "GoSUSPEND", the state changes into the suspend state. When the state goes to the suspend state, the hardware circuit turns off the disconnection detection function and the remote wakeup detection function. Furthermore, the hardware circuit stops the transaction execution function of the USB host when the current transaction is completed. If the port is in the HS mode, the port is set to be the FS mode and the state is changed into the power down status. The disconnection detection function is then turned on after the disable terms of the disconnection detection and the remote wakeup detection finished. Furthermore, if a remote wakeup receive permit (RmtWkupDetEnb) is enable, the remote wakeup detection function is turned on. Subsequently, a suspend transition complete status (SuspendCmp) is issued to the firmware. Moreover, if the remote wakeup receive permit is in an enable state and a remote wakeup signal is detected, a remote wakeup detection status (DetectRmtWkup) is issued to the firmware.

When the firmware issues the individual state transition execution command "GoRESUME", the state changes into the resume state. When the state goes to the resume state, the hardware circuit turns off the disconnection detection function and the remote wakeup detection function, and issues a resume signal (k) having a predetermined time. Furthermore, the hardware circuit resets the port to the previous mode before the suspend state when the issue of the resume signal is completed, setting the state to the normal operation status. Moreover, a resume complete status (ResumeCmp) is issued to the firmware.

As described above, according to the embodiment, the firmware can change the state of the data transfer control device into a desired state only by issuing the state transition execution command. When the state transition execution command is issued, the hardware circuit in the data transfer control device automatically executes the processes such as the line state control and detection. When the execution is completed, the execution completion and the various states are notified to the firmware by issuing the interruption. Thereby, the firmware can intelligently control the process of deciding which state the current state should be changed into by issuing the state transition execution command corresponding to each status. Meanwhile, time restricted processes such as the line state control and detection are handled by the hardware circuit. Thereby, it is possible to reduce the processing load of the firmware and to realize the effective state control.

4. Successive State Transition

As the state transition execution command, a successive state transition execution command which successively changes the state of the data transfer control device from a Lth ($1 \leq L \leq N$) state to a Mth ($1 \leq M \leq N$) state is provided in this embodiment. In this successive state transition execution command, the state of the data transfer control device is changed to the Lth state from a state other than the Lth state and the Mth state, then the state of the data transfer control device is automatically changed begging from the Lth state and to the Mth state.

Figure 3:
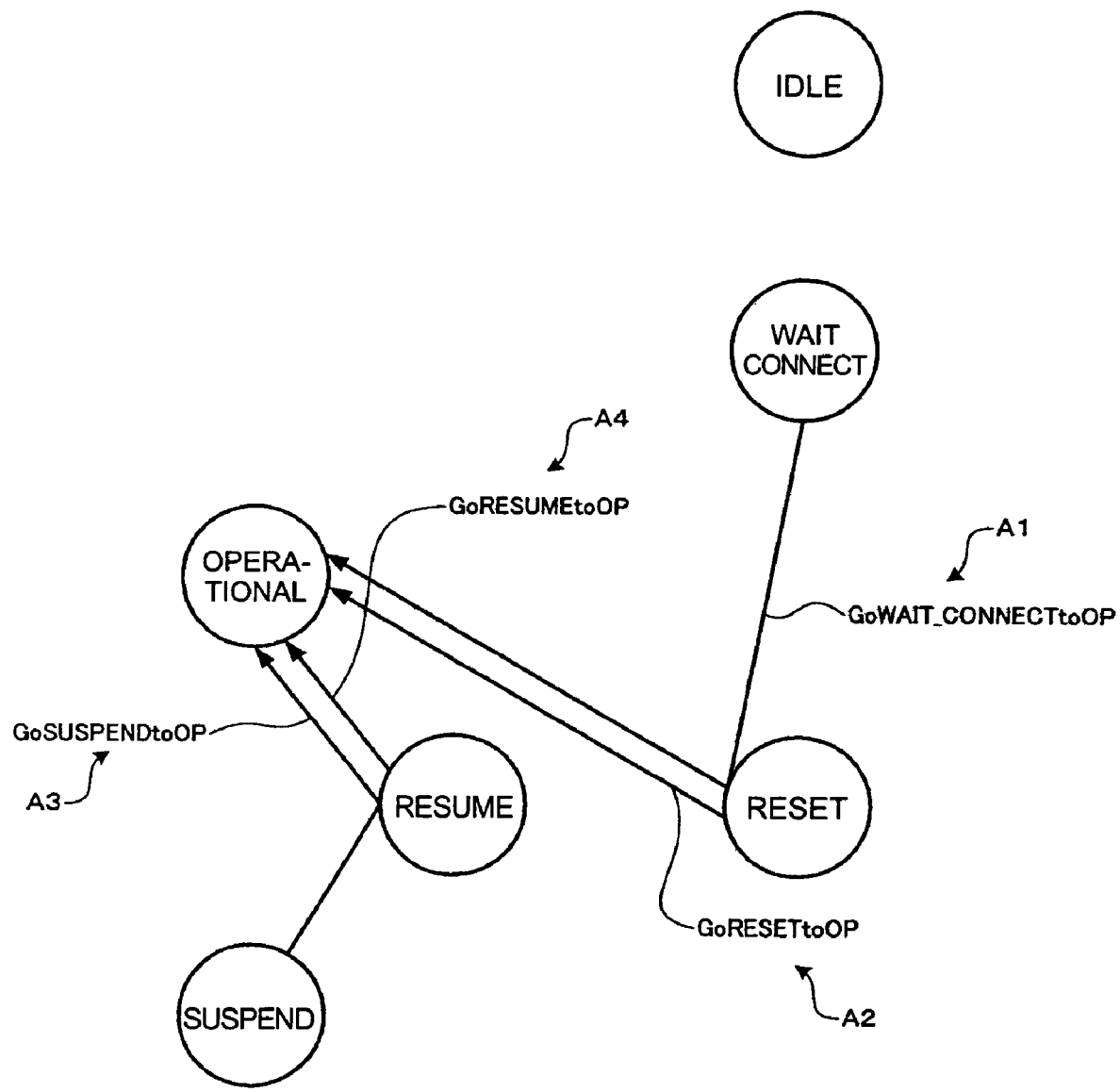
FIG. 3 is an explanatory drawing of a successive state transition method.

When the firmware issues the successive state transition execution command "GoWAIT_CONNECTtoOP" denoted by A1 in FIG. 3, the state of the data transfer control device changes into the wait connect state (the Lth state in a broad sense). The hardware circuit then executes the wait connect state process (the line state control and detection) that was described above in the individual state transition description. When the execution of the wait connect state process is finished, the state automatically goes into the reset state.

In the individual state transition, the interruption is notified to the firmware when the wait connect state process finishes, the firmware receives the notification and issues the next individual state transition execution command "GoRESET". However, in the successive state transition, the hardware circuit automatically changes the state into the reset state and the firmware does not need to issue the next individual state transition execution command "GoRESET".

When the state goes to the rest state, the hardware circuit performs the reset state process described above in the individual state transition description. When the reset state process is completed, the state automatically changes into the operational state (the Mth state in a broad sense). In other words, the state automatically goes to the operational state by the hardware circuit and the firmware does not need to issue the next individual state transition execution command "GoOPERATIONAL".

In the same manner, when the firmware issues the successive state transition execution command "GoRESETtoOP" denoted by A2 in FIG. 3, the state changes into the reset state (the Lth state). When the reset state process is completed, the state automatically goes to the operational state (the Mth state). Furthermore, when the firmware issues the successive state transition execution command "GoSUSPENDtoOP" denoted by A3 in FIG. 3, the state changes into the suspend state (the Lth state). When the process of the suspend state is completed, the state automatically goes to the resume state. When the process of the resume state finishes, the state automatically changes to the operational state (the Mth state). Moreover, when the firmware issues the successive state transition execution command "GoRESUMEtoOP" denoted by A4 in FIG. 3, the state changes into the resume state (the Lth state). When the process of the resume state is completed, the state automatically goes to the operational state (the Mth state).

In the individual state transition method, the firmware has to issue a plurality of the individual state transition execution commands such as GoWAIT_CONNECT, GoRESET and GoOPERATIONAL. Therefore, the processing load of the firmware becomes heavy. On the other hand, in the successive state transition method, the firmware only has to issue the successive state transition execution command such as "GoWAIT_CONNECTtoOP". Thereby, the processing load of the firmware can be reduced and it is possible to make the state control more efficient. In this embodiment, only one of the individual state transition method or the successive state transition method may be adopted.

5. Configuration of Data Transfer Control Device

Figure 4:
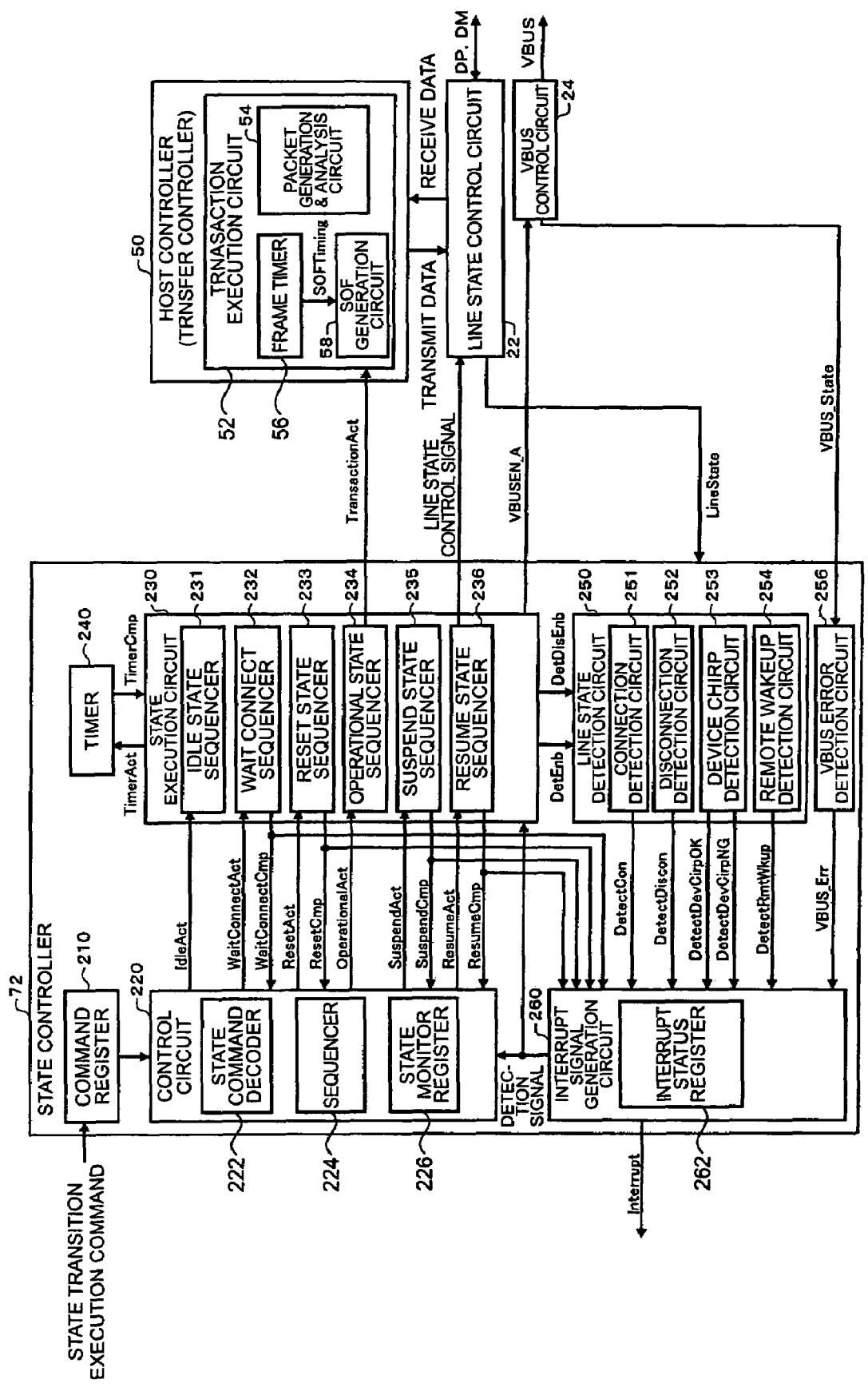
FIG. 4 is a configuration example of the data transfer control device according to the embodiment.

FIG. 4 shows a configuration example of the data transfer control device according to the embodiment. The data transfer control device includes a state controller 72, a host controller 50 (the transfer controller in a broad sense), a line state control circuit 22 and a VBUS control circuit 24. A part of the above-mentioned components may be omitted.

The state controller 72 is the controller controlling the state (a host state and a bus state) of the data transfer control device. The state controller 72 includes a command register 210, a control circuit 220, a state execution circuit 230 (a state sequencer), a timer 240, a line state detection circuit 250, a VBUS error detection circuit 256 and an interrupt signal generation circuit 260. A part of the above-mentioned components may be omitted.

The state transition execution command is set in the command register 210 (a control register). More specifically, a code of the state transition execution command is written into the command register 210 by the firmware (the processing unit).

The control circuit 220 decodes the state transition execution command (the individual state transition execution command and the successive state transition execution command) set in the command register 210, and then controls the state execution circuit 230 based on the result of the decoding. To be more specific, when the individual state transition execution command going into the Kth state is set in the command register 210, the control circuit 220 makes the state execution circuit 230 execute the Kth state process. For example, in a case of the individual state transition execution command "GoRESET" changing into the reset state shown in FIG. 2, the control circuit 220 has the state execution circuit 230 (a reset state sequencer 233) perform the reset state process (a sequence control).

When the successive state transition execution command changing from the Lth state to the Mth state is set in the command register 210, the control circuit 220 makes the state execution circuit 230 conduct the plurality of the state processes from the Lth state to the Mth state successively (automatically). For example, in a case of the successive state transition execution command "GoWAIT_CONNECTtoOP" denoted by A1 in FIG. 3, the state execution circuit 230 (state sequencers 232, 233 and 234) successively executes the state processes from the wait connect to the operational through the reset.

The control circuit 220 includes a state command decoder 222, a sequencer 224 and a state monitor register 226. The state command decoder 222 decodes the state transition execution command set in the command register 210. The sequencer 224 performs a sequence control which is necessary to conduct the state transition execution command. The sequencer 224 conducts the sequence control based on the decoding result of the state transition execution command, a completion signal (WaitConnectCmp, ResetCmp and the like) from the state execution circuit 230 and the detection signal (DetectCon, DetectDiscon and the like) from the interrupt signal generation circuit 260 (the line state detection circuit 250). The state monitor register 226 shows the current state (idle, waitconnect and the like) to the firmware.

The state execution circuit 230 executes each state process of the first-Nth states (idle, waitconnect, reset, operational, suspend and resume states) for the state control of the data transfer control device. More specifically, when the individual state transition execution command is set, the state execution circuit 230 conducts the state process based on an activating signal (IdleAct, WaitConnectAct and the like) form the control circuit 220 and the detection signal (DetectCon, DetectDiscon and the like) from the interrupt signal generation circuit 260 (the line state detection circuit 250). When the successive state transition execution command is set, the state execution circuit 230 consecutively (automatically) executes the plurality of the state processes based on the above-mentioned activating signal and the detection signal.

The state execution circuit 230 uses the timer 140 for a time counting process in order to perform the state process. In other words, the timer 140 is started by a timer activating signal "TimerAct" and the state execution circuit 230 counts a wait time by receiving a timer completion signal "TimerCmp" from the timer 140.

Furthermore, the state execution circuit 230 outputs signals "DetEnb" and "DetDisEnb" to the line state detection circuit 250. The signal "DetEnb" enables the required detection circuit (detection function) among the detection circuits (detection circuits 251, 252, 253 and 254) included in the line state detection circuit 250. On the contrary, the signal "DetDisEnb" diables the unnecessary detection circuits. In this way, each detection circuit can be operated at an appropriate timing (a timing decided by the standard) in each state, and it can prevent malfunction and the like from occurring.

The state execution circuit 230 includes first-Nth state sequencers conducting the first-Nth state processes. More specifically, the state execution circuit 230 includes an idle state sequencer 231, a wait connect state sequencer 232, a reset state sequencer 233, an operational state sequencer 234, a suspend state sequencer 235 and a resume state sequencer 236. In the case of the individual state transition execution command, the control circuit 220 outputs an activating signal of the state process execution to the Kth state sequencer that executes the Kth state process. For example, in the case of the individual state transition execution command going to the reset state, an activating signal "ResetAct" is outputted to the reset state sequencer 233.

In the case of the successive state transition execution command, the control circuit 220 sequentially outputs activating signal s of the state process execution to the Lth-Kth state sequencers that correspondingly conduct the Lth-Kth state processes. The control circuit 220 also receives the completion signal of the state process execution from each state sequencer. For example, in the case of the successive state transition execution command "GoWAIT_CONNECT-toOP", the activating signals "WaitConnectAct", "ResetAct" and "OperationalAct" are correspondingly outputted to the wait connect state sequencer 232, the reset state sequencer 233 and the operational state sequencer 234. The control circuit 220 then sequentially receives the completion signal "WaitConnectCmp", "ResetCmp" from the state sequencers 232, 233.

The idle state sequencer 231 included in the state execution circuit 230 starts the process when the activating signal "IdleAct" is asserted. The idle state sequencer 231 then performs initializing processes of the register including transceiver select, terminal select and port speed. The wait connect state sequencer 232 states the process when the activating signal "WaitConnectAct" is asserted. The wait connect state sequencer 232 conducts state processes (sequence controls) such as asserting a VBUS enable signal "VBUSEN_A", enabling or disabling the connection detection or the disconnection detection, and disabling the device chirp detection and the remote wakeup detection. When the process finishes, the wait connect state sequencer 232 asserts the completion signal "WaitConnectCmp".

The reset state sequencer 233 starts the process when the activating signal "ResetAct" is asserted. The reset state sequencer 233 conducts the state processes such as outputting the line state control signals for the reset issue of the USB and the host chip issue to the line state control circuit 22, disabling the connection detection, the disconnection detection and the remote wakeup detection, and enabling the device chirp. When the process finishes, the reset state sequencer 233 asserts the completion signal "ResetCmp". The operational state sequencer 234 starts the process when the activating signal "OperationalAct" is asserted. The operational state sequencer 234 asserts a transaction execution activating signal "TransactionAct" and a transaction execute circuit 52 in the host controller 50 begins to execute the transaction process.

The suspend state sequencer 235 starts the process when an activating signal "SuspendAct" is asserted. The suspend state sequencer 235 conducts the state processes such as disabling or enabling the disconnection detection and the remote wakeup detection. When the process finishes, the suspend state sequencer 235 asserts the completion signal "SuspendCmp". The resume state sequencer 236 starts the process when an activating signal "ResumeAct" is asserted. The resume state sequencer 236 conducts the state processes such as disabling the disconnection detection and the remote wakeup detection and outputting the line state control signals for the resume signal issue to the line state control circuit 22. When the process finishes, the resume state sequencer 236 asserts the completion signal "ResumeCmp".

As described above, this embodiment can realize both the individual state transition and the successive state transition only by controlling the activating signals to the state sequencers 231-236 and the like because the state sequencers 231-236 that can independently conduct each state process are provided. In other words, it is possible to conduct the individual state transition by selecting the activating signal to be asserted, and it is possible to conduct the successive state transition by controlling the order of the activating signal that should be asserted. Thereby, the circuit configuration and the processes can be simplified.

The line state detection circuit 250 detects line states of data lines DP, DM. To be more specific, the line state detection circuit 250 detects the line state when a signal "LineState" is sent from the line state control circuit 22. The line state detection circuit 250 includes the connection detection circuit 251 detecting the device connection, the disconnection detection circuit 252 detecting the device disconnection, the device chirp detection circuit 253 detecting chirp transmission from the device and the remote wakeup detection circuit 254 detecting the wakeup signal from the device. The signal "LineState" is a 2-bit signal indicating the status of the data lines DP, DM which is one of "SE0", "J" or "K". The detection circuits 251-254 count time by using the signal "LineState" as a trigger, and perform the detection processes of connection, disconnection, device chirp and remote wakeup. The detection circuits 251-254 then output the detection signals "DetectCon", "DetectDiscon", "DetectDevChirpOK", "DetectDevChirpNG" and "DetectRmtWkup" to the interrupt signal generation circuit 260. The detection functions of the detection circuits 251-254 are turned on or off based on the signal "DetEnb" and "DetDisEnb" from the state execution circuit 230.

The VBUS error detection circuit 256 detects the error of the power supply line VBUS when a signal "VBUS_State" is sent, and outputs the detection signal "VBUS_Err".

The interrupt signal generation circuit 260 generates an interrupt signal "Interrupt" and outputs the signal to the firmware (the processing unit) that sets the state transition execution command in the command register 210. The interrupt signal generation circuit 260 includes a status register 262 in which a status of an interruption element is set.

In this embodiment, the interrupt signal generation circuit 260 receives the completion signals "WaitConnectCmp", "ResetCmp", "SuspendCmp" and "ResumeCmp" from the state sequencers 232, 233, 235, 236, and generates the interrupt signal "Interrupt" according to these completion signals. For example, in the case of the individual state transition, it is possible to notify the firmware of the state process completion by using the interrupt signal "Interrupt" generated based on the completion signals "WaitConnectCmp"-"ResumeCmp". Thereby, it is possible to prompt the firmware to issue the next individual state transition execution command. On the other hand, in the case of the successive state transition, these completion signals "WaitConnectCmp"-"ResumeCmp" are outputted to the control circuit 220. The control circuit 220 generates the activating signal for the next state process based on the completion signals "WaitConnectCmp"-"ResetCmp". Thereby, it is possible for the control circuit 220 to control the state transition instead of the firmware.

The host controller 50 (the transfer controller) performs the control for the data transfer based on the results of the state processes in the state execution circuit 230. The host controller 50 includes the transaction execute circuit 52. The transaction execute circuit 52 starts the transaction process when the state goes into the operational state and the operational state sequencer 234 asserts the activating signal "TransactionAct". More specifically, a SOF generation circuit 58 generates SOF according to a SOF timing signal "SOFTiming" from a frame timer 56. A packet generation & analysis circuit 54 performs a generation process of a transmission packet including send data and an analysis process of a receive data including a receive packet.

The line state control circuit 22 controls the line state of the data lines DP, DM. More specifically, the line state control circuit 22 receives the line state control signal from the state execution circuit 230, and controls the line state based on this line state control signal. The line state control signal is a signal instructing the reset issue, the host chirp issue and the resume issue. For example, when the line state control circuit 22 receives the line state control signal instructing the reset issue or the host chirp issue from the reset state sequencer 233, the line state control circuit 22 conducts the line state control for outputting the reset signal or the host chip signal to the USB. When the line state control circuit 22 receives the line state control signal instructing the resume issue from the resume state sequencer 236, the line state control circuit 22 performs the line state control for outputting the resume signal to the USB.

The VBUS (power supply line) control circuit 24 receives the VBUS enable signal "VBUSEN_A" and carries out a power supply control of the VBUS line. The VBUS control circuit 24 outputs the VBUS state signal "VBUS_State" to the VBUS error detection circuit 256.

Figure 5:
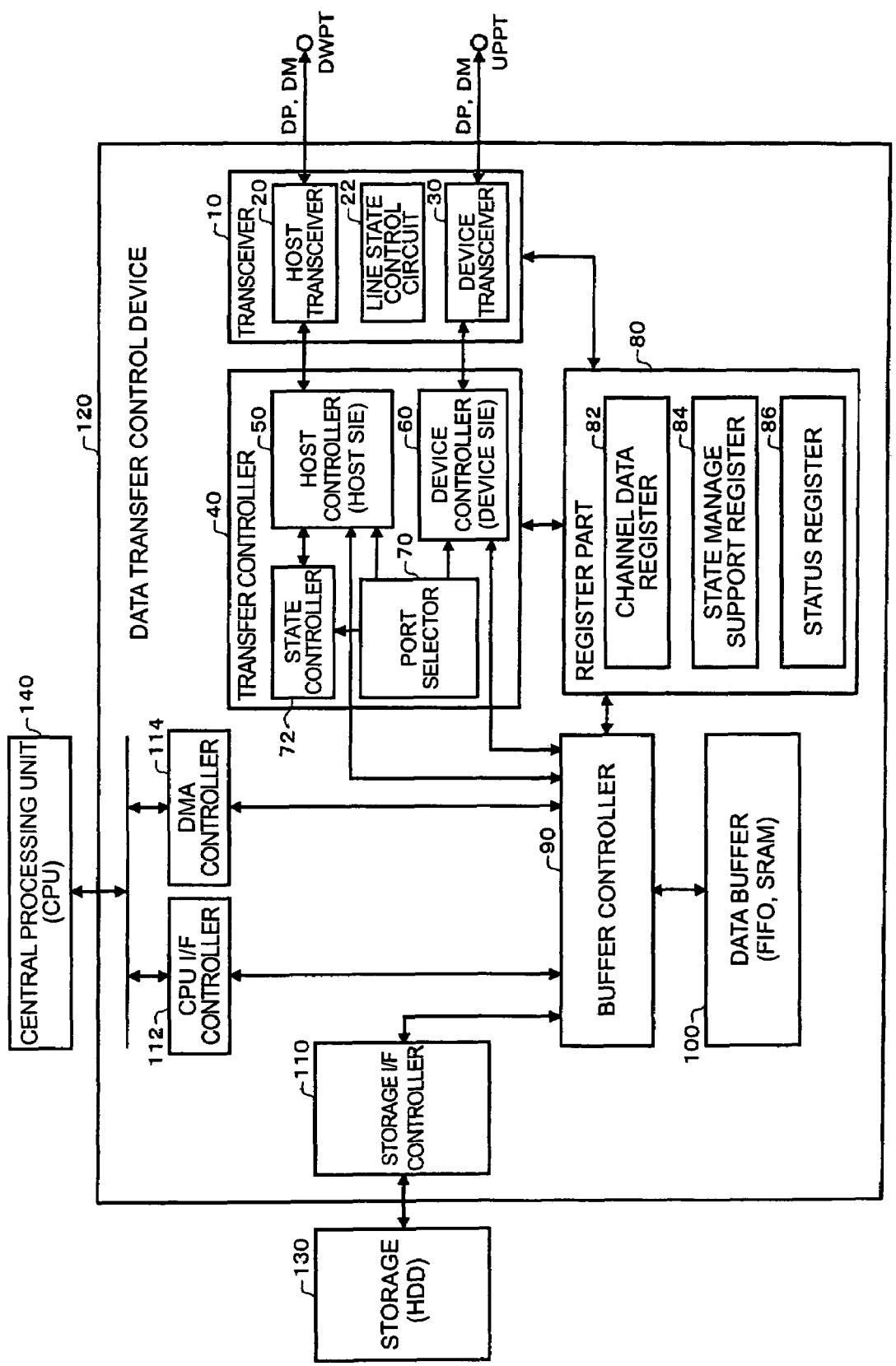
FIG. 5 is a detail drawing of the configuration example of the data transfer control device according to the embodiment.

FIG. 5 shows a detail configuration example of the data transfer control device according to the embodiment. A data transfer device 120 includes a transceiver 10, a transfer controller 40, a register part 80, a buffer controller 90, a data buffer 100, a storage I/F (interface) controller 110, a CPU I/F controller 112 and a direct memory access (DMA) controller 114. A part of the above-mentioned components may be omitted. For example, the transceiver 10 and the data buffer 100 may be omitted. In addition, the CPU 140 (the processing unit) may be included in the data transfer device 120.

The transceiver 10 (a dual transceiver) is a circuit for sending and receiving data of the USB (the bus or the serial bus in a broad sense) by using a differential signal (DP, DM). The transceiver 10 includes a host transceiver 20, the line state control circuit 22 and a device transceiver 30.

The host transceiver 20 has an analog front-end circuit (a physical layer circuit) and a high-speed logic circuit in order to support the HS mode (480 Mbps), the FS mode (12 Mbps) and the LS mode (1.5 Mbps).

The device transceiver 30 has the analog front-end circuit (the physical layer circuit) and the high-speed logic circuit to support the HS mode and the FS mode. A circuit compliant with USB 2.0 Transceiver Macrocell Interface (UTMI) can be used as the device transceiver 30.

The transfer controller 40 is a controller to control the data transfer through the USB. The transfer controller 40 carries out the data transfer control of a transaction layer and a link layer. The transfer controller 40 includes the host controller 50, a device controller 60, a port selector 70 and the state controller 72. A part of the above-mentioned components may be omitted.

The host controller 50 (host serial interface engine) controls the data transfer in a host mode. More specifically, the host controller 50 schedules (issues) a transaction, manages a transaction, generates and analyzes a packet.

The device controller 60 (device serial interface engine) controls the data transfer in a device mode. More specifically, the device controller 60 manages a transaction, generates and analyzes a packet.

The port selector 70 is a selector that selects and enables either the host mode or the device mode. Therefore, the data transfer device 120 shown in FIG. 5 has both an upstream port UPPT (a first port in a broad sense) and a downstream port DWPT (a second port in a broad sense). When the host mode is selected according to the setting of the register and the like, the port selector 70 selects (enables) the host controller 50 and the host transceiver 20. The data transmission to the device (other electronic equipment) coupled with the downstream port DWPT is realized with the host controller 50 and the host transceiver 20.

When the device mode is selected according to the setting of the register and the like, the port selector 70 selects (enables) the device controller 60 and the device transceiver 30. The data transmission to the device (other electronic equipment) coupled with the upstream port UPPT is realized with the device controller 60 and the device transceiver 30.

The register part 80 includes a channel data register 82, a state manage support register 84 and a status register 86. These registers may be configured with memories such as random access memory (RAM) or flip-flop. The registers in the register part 80 may be provided so as to be distributed in each circuit block.

A channel data (channel information) of a channel area (a plurality of channel areas) secured in the data buffer 100 is set in the channel data register 82. As the channel data (a transfer setting information), there are a max packet size, a function address (USB address) of the device coupled to the USB, a transfer speed, a toggle sequence bit, a start address and an end address in each channel region in the data buffer 100. The state manage support register 84 is the register used for the state manage support function described above with reference to FIGS. 2-4. Various status data of the data transfer control device 120 and the data transfer are indicated by the status register 86.

The buffer controller 90 allocates the areas (the channel area, the endpoint area and the like) to the data buffer 100, and controls the access to the data buffer 100. The buffer controller 90 also controls the pointer of the area allocated in the data buffer 100 and performs a first-in-first-out (FIFO) control.

The data buffer 100 is a buffer for temporarily storing (buffering) the data (transmission data, receive data) transferred through the USB (the serial bus). The data buffer 100 can be configured by a memory such as RAM.

The storage I/F controller 110 conducts an I/F (interface) control to a storage 130 that is a mass storage such as HDD. To be more specific, the storage I/F controller 110 carries out the I/F control of Integrated Drive Electronics (IDE) (ATA/ATAPI). The CPU I/F controller 112 conducts the interface control to the CPU 140 (the processing unit in a broad sense). In this way, it makes it possible for the CPU 140 to access the register. The DMA controller 114 performs the DMA control in the CPUI/F. This makes it possible for the CPU 140 to access the data buffer 100.

Figure 16:
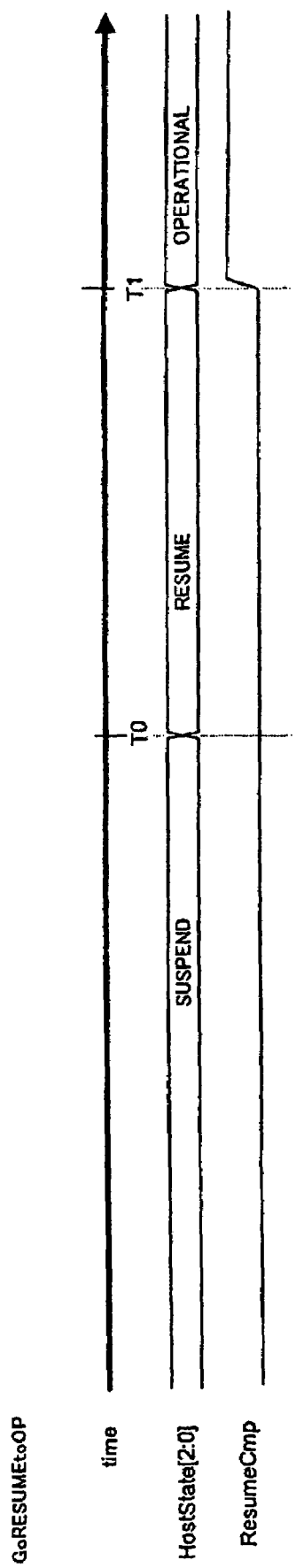
FIG. 16 is a timing waveform chart for explaining "GoRE-SUMEtoOP".

The register and its function used in the embodiment are shown in FIG. 16. The state transition execution command register is the register for setting the state transition execution command such as "GoIDLE" and the like. A state transition execution cancel register is the register for canceling the state transition execution command. The state monitor register and a VBUS state monitor register indicates a current state (idle, waitconnect and the like) and a VBUS state respectively. A remote wakeup receive permit register is for setting the remote wakeup receive permission. A VBUS error detection status register, a connection detection status register, a disconnection detection status register and a emote wakeup detection status register are respectively for indicating the status of VBUS error occurrence, the device connection to the downstream port, the device disconnection from the downstream port and the detection of the remote wakeup signal from the device. A device chirp error detection status register and a device chirp normal detection status register are for indicating that the chirp signal from the device is normal or abnormal. A reset complete status register, a suspend transition complete status register and a resume complete status register are respectively for indicating that the USB reset is successfully completed, the transition to the suspend is completed and that the resume is successfully completed. A port speed register shows a operation speed of the downstream port, and a line state register shows a signal state of the USB cable. A transceiver select register is for enabling a transceiver by selecting one of the HS/FS/LS transceivers. A terminal select register is for enabling a terminal by selecting one of the HS/FS/LS terminals. An operation mode register is a resister for setting an operation mode of the transceiver.

6. Detail of Individual State Transition Execution Command

Figure 7:
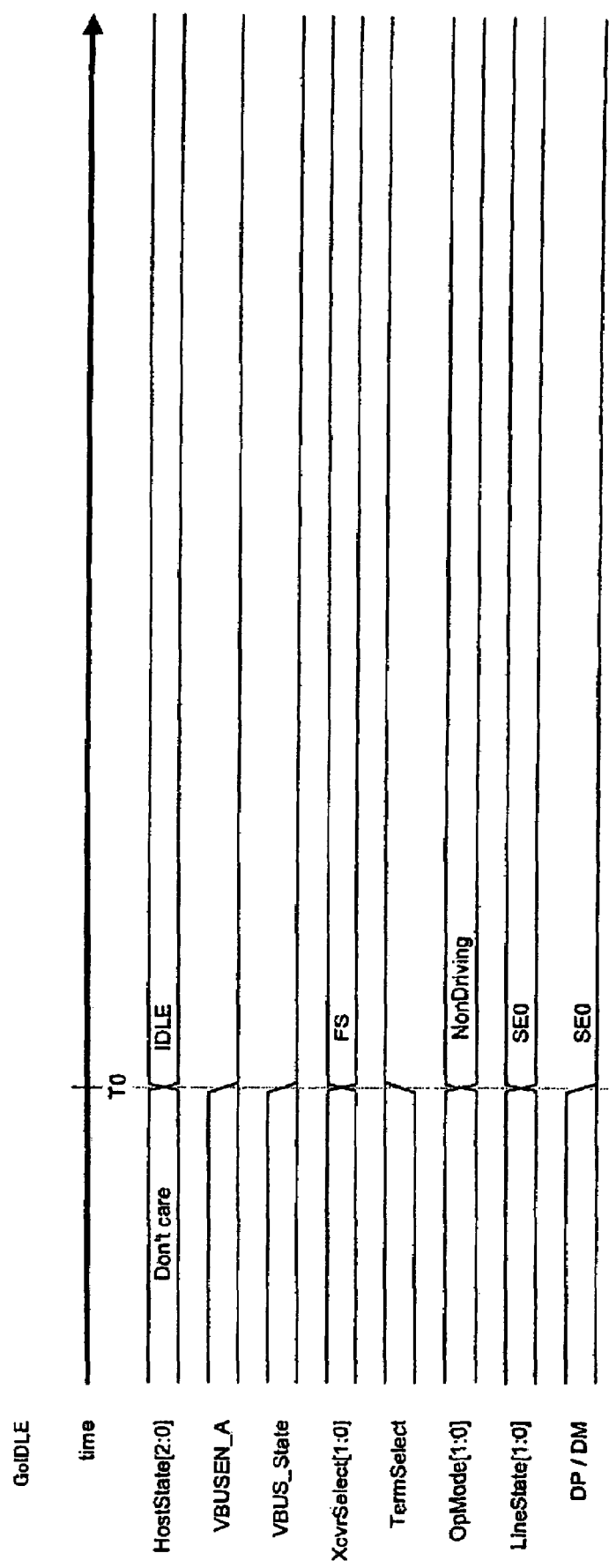
FIG. 7 is a timing waveform chart for explaining "GoIDLE".

Next, details of the individual state transition execution command are described with reference to the timing waveform charts shown in FIG. 7 through FIG. 12. FIG. 7 is a timing waveform chart when the individual state transition execution command "GoIDLE" is issued. When "GoIDLE" is set by the firmware (T0), the hardware circuit (the control circuit, the idle state sequencer) executes the following state processes.

Firstly, a host state monitor (HostState [2:0]) is set to be idle, and "VBUSEN_A" is set to be off (T0). The transceiver selection (XcvrSelect [1:0]) and the terminal selection (TermSelect) are set in the FS mode. The operation mode (OpMode [1:0]) is set to be in a non-driving state (T0). In addition, the transaction execution function of the USB host is promptly halted and all the detection functions including the connection detection, the disconnection detection, the remote wakeup detection and the device chirp detection are turned off (T0).

Figure 8:
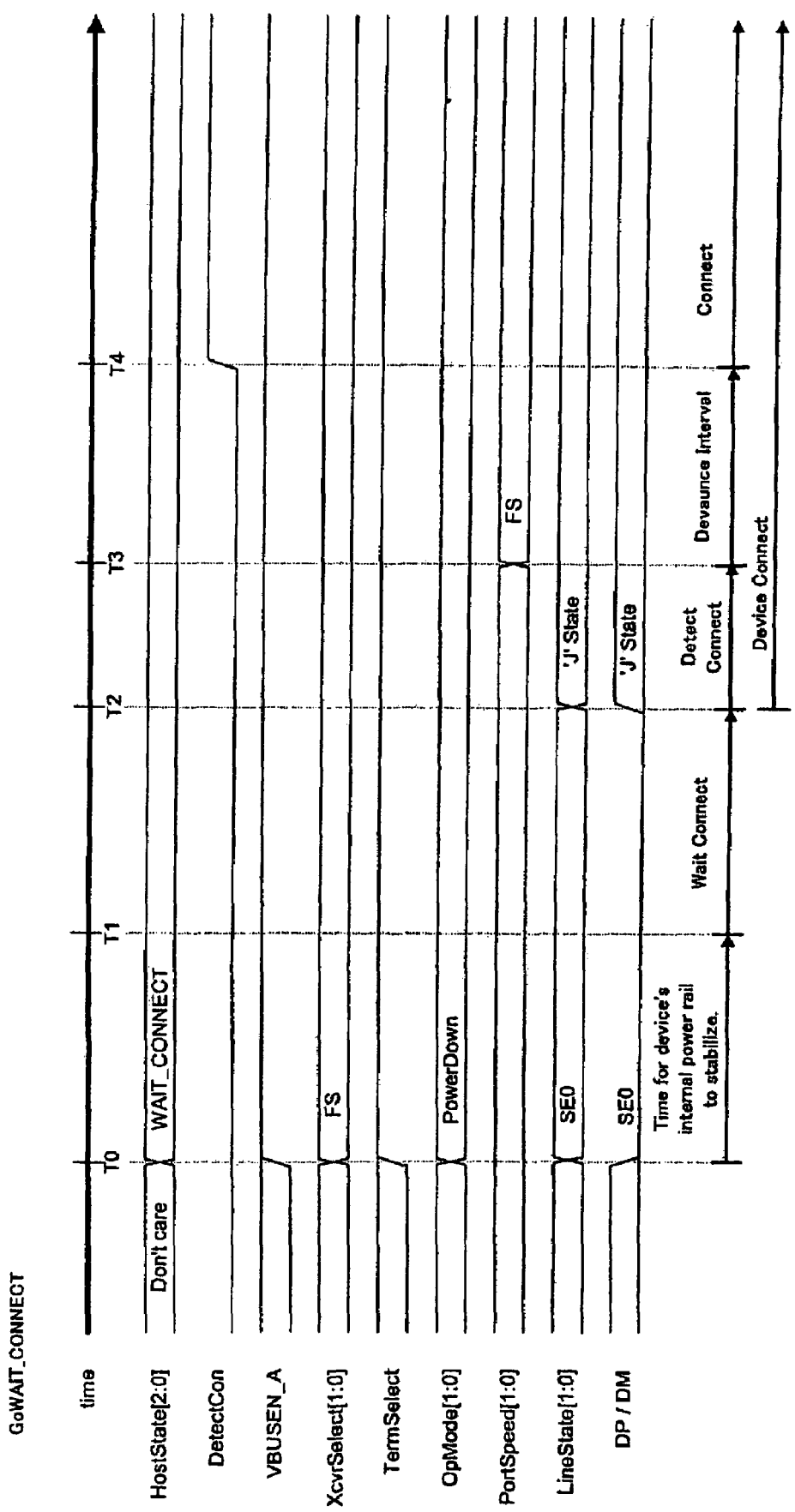
FIG. 8 is a timing waveform chart for explaining "GoWAIT_CONNECT".

FIG. 8 is a timing waveform chart when the individual state transition execution command "GoWAIT_CONNECT" is issued. FIG. 8 shows a case that the FS device is coupled to the downstream port. However, the HS device is recognized as the FS device at this point. When "GoWAIT_CONNECT" is set by the firmware (T0), the hardware circuit (the control circuit, the idle state sequencer) executes the following state processes.

Firstly, the host state monitor (HostState [2:0]) is set to the waitconnect, and "VBUSEN_A" is set to be on (T0). The transceiver selection (XcvrSelect [1:0]) and the terminal selection (TermSelect) are then set in the FS mode. The operation mode (OpMode [1:0]) is set to be in a power down state (T0).

After a predetermined time period passes in order to stabilize the power source in the device, the connection detection function is turned on (T1). When the FS device is coupled, "J" appears in the line state (LineState) (T2). If "J" continues for longer than 2.5 μs, it is considered that the FS device is coupled (T3). Subsequently, the port speed (PortSpeed [1:0]) is set to be FS, the connection detection function is turned off and the disconnection detection function is turned on (T3). If the disconnection is not detected during a debounce interval, the connection detection status (DetectCon) is issued (T4).

Figure 9:
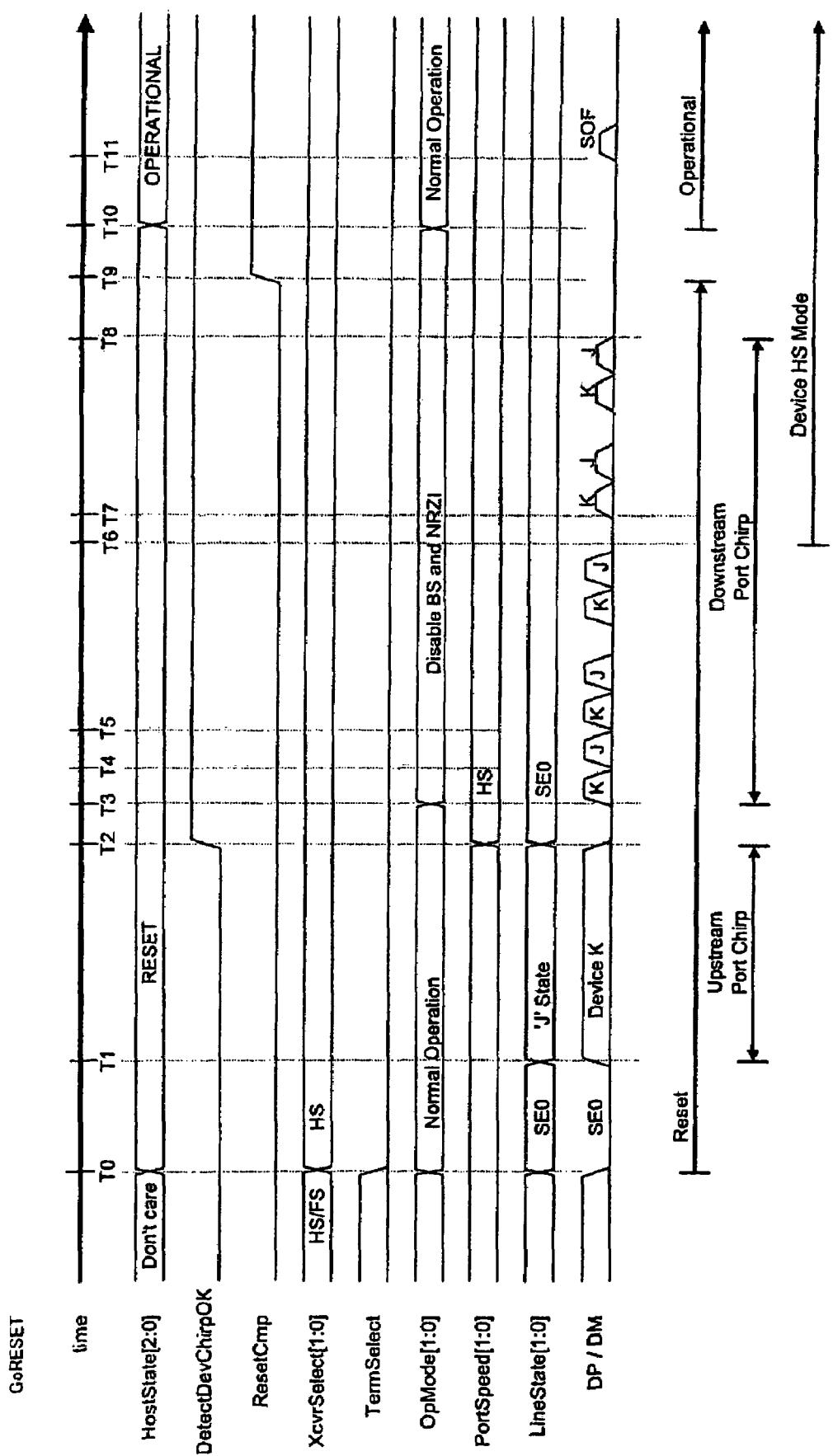
FIG. 9 is a timing waveform chart for explaining "GoRESET".

FIG. 9 is a timing waveform chart when the individual state transition execution command "GoRESET" is issued. When "GoRESET" is set by the firmware (T0), the hardware circuit (the control circuit, the idle state sequencer) executes the following state processes.

Firstly, the transceiver selection (XcvrSelect [1:0]) and the terminal selection (TermSelect) are set in the HS mode. The operation mode (OpMode [1:0]) is then set to be in a normal mode, and the device chirp detection function is turned on (T0).

When "K" continues in the line state (LineState [1:0]) for longer than 2.5 μs, the device chirp is recognized. If the device chirp finishes (LineState [1:0] becomes "SE0") within a predetermined time period from the start of the reset, the device chirp normal detection status (DetectDevChirpOK) is issued (T2). Subsequently, the device chirp detection function is turned off (T2).

Following the device chirp completion, the host (the hardware circuit) starts to output the chirp "K". After that, the host alternatively outputs the chirp "K" and the chirp "J" (T3-T8). When the device detects the host's chirp, the device is changed to the HS mode (T6), enabling a HS termination (T7). The host then finishes sending the chirp (T8). The reset is ended and the reset complete status (ResetCmp) is issued (T9).

Figure 10:
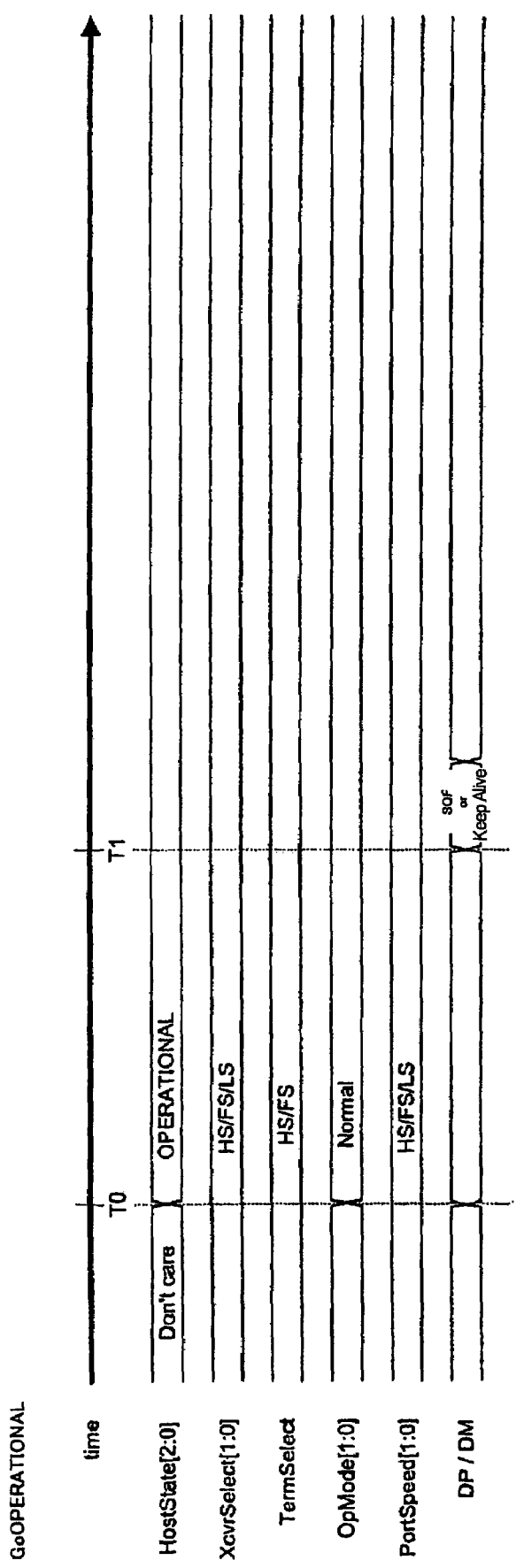
FIG. 10 is a timing waveform chart for explaining "GoOPERATIONAL".

FIG. 10 is a timing waveform chart when the individual state transition execution command "GoOPERATIONAL" is issued. When "GoOPERATIONAL" is set by the firmware (T0), the hardware circuit (the control circuit, the idle state sequencer) executes the following state processes.

Firstly, the host state monitor (HostState) is set to be operational, and the operation mode (OpMode [1:0]) is then set to be in the normal mode (T0). The state is set to execute the USB transaction and the disconnection detection function is set to be on (T0). When the port speed (PortSpeed [1:0]) is the HS or the FS, the first SOF is issued. When the port speed is the LS, the first "KeepAlive" is issued (T1). The following data transfer is conducted based on the setting of the channel.

Figure 11:
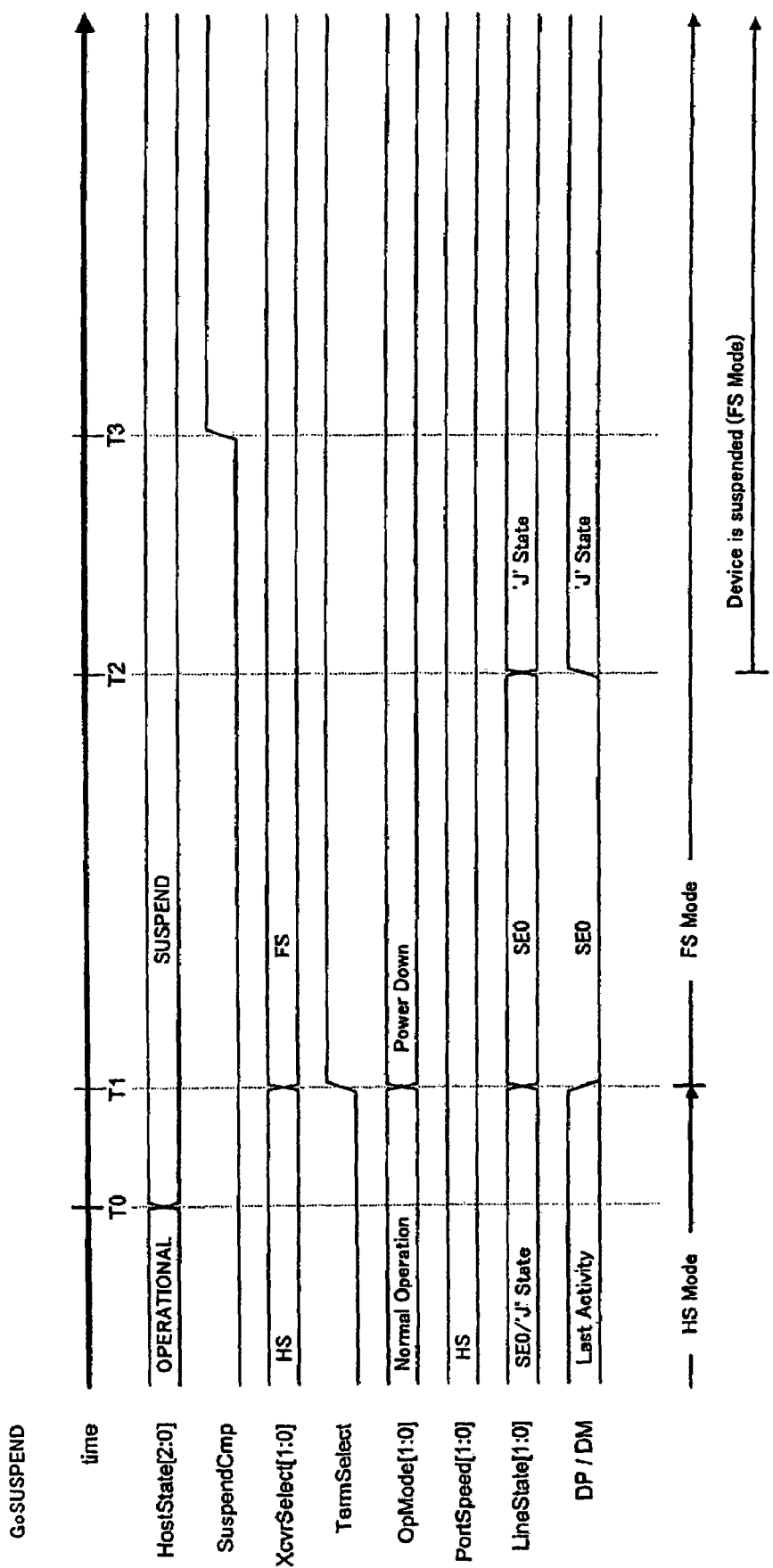
FIG. 11 is a timing waveform chart for explaining "GoS-USPEND".

FIG. 11 is a timing waveform chart when the individual state transition execution command "GoSUSPEND" is issued. When "GoSUSPEND" is set by the firmware (T0), the hardware circuit (the control circuit, the idle state sequencer) executes the following state processes. FIG. 11 shows the case that the HS device is coupled.

Firstly, the disconnection detection function and the remote wake up detection function are turned off (T0). After the transaction that is in execution that time is completed, the transceiver selection (XcvrSelect [1:0]) and the terminal selection (TermSelect) are set in the FS mode. The operation mode (OpMode [1:0]) is then set to be in the power down state.

Next, the disconnection detection function is set to be turned on (T3). When the remote wakeup receive permit (RmtWkupDetEnb) is set to be enable, the remote wakeup detection function is set to be on (T3). The suspend transition complete status (SuspendCmp) is then issued to the firmware (T3).

Figure 12:
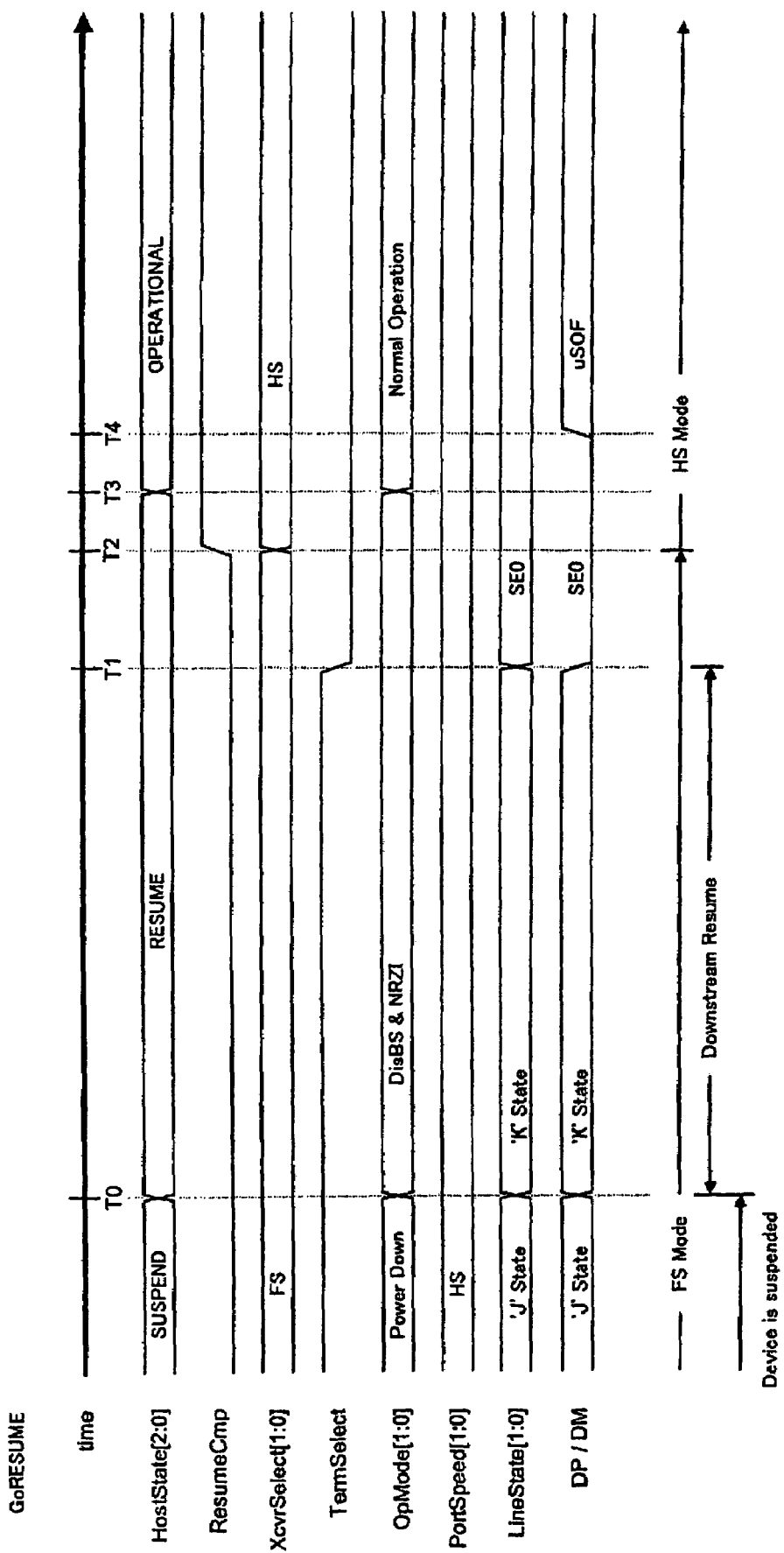
FIG. 12 is a timing waveform chart for explaining "GoRE-SUME".

FIG. 12 is a timing waveform chart when the individual state transition execution command "GoRESUME" is issued. When "GoRESUME" is set by the firmware (T0), the hardware circuit (the control circuit, the idle state sequencer) executes the following state processes. FIG. 12 shows the case that the HS device is coupled.

Firstly, the disconnection detection function and the remote wake up detection function are turned off (T0). The operation mode (OpMode [1:0]) is then set to be DisBS&NRZI and the resume signal "K" is issued (T0).

Next, the terminal selection (TermSelect) is set to the HS after the issue of the resume signal "K" is completed. The transceiver selection (XcvrSelect) is set to the HS and the resume complete status (ResumeCmp) is then issued to the firmware (T2).

According to the embodiment, when the firmware sets the individual state transition execution command, various setting of the register, mode and signal and on-off setting of the various detection functions are automatically conducted by the hardware circuit as shown in FIG. 7 through FIG. 12. The complete status (complete interrupt) is then sent to the firmware when the state process is completed. Then, the firmware can set the next individual state transition execution command. Thereby, the firmware only has to control which state should be executed next. This leads to reduce the processing unit of the firmware. Furthermore, the firmware can handle an intelligent process that is not suitable for the hardware. Therefore, it is possible to keep the increase in the size of the hardware circuit minimum.

Moreover, according to the embodiment, the firmware only has to monitor the complete status and the like, and it is possible to leave most of the time management of the process to the hardware circuit. Thereby, it is possible to reduce the processing load of the firmware. For example, the timer 240 of the hardware circuit can count a wait time (100 ms) denoted by T0-T1 in FIG. 8 for turning the connection detection function on, a wait time (2.5 µs) denoted by T2-T3 in which the port speed is set to the FS, the connection detection function is turned off and the disconnection detection function is turned on, and the debounce interval (100 ms) denoted by T3-T4 and the like. The hardware circuit can also count the various time periods shown in FIG. 9 through FIG. 15. In this way, the processing load of the firmware can be reduced.

7. Detail of Successive State Transition Execution Command

Figure 13:
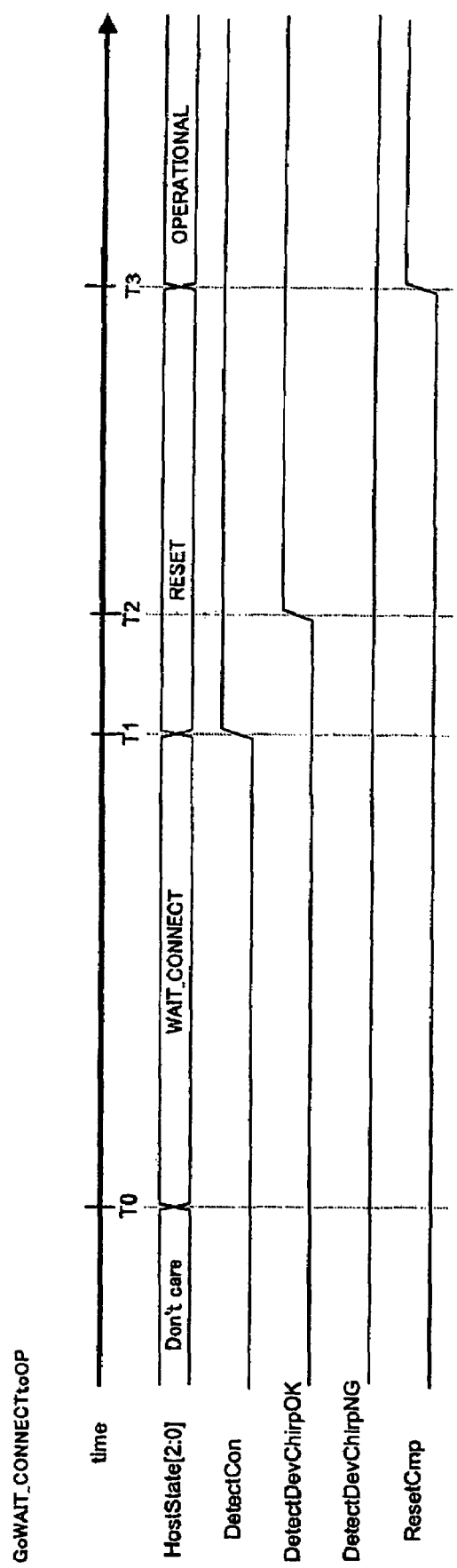
FIG. 13 is a timing waveform chart for explaining "GoWAIT_CONNECTtoOP".

Next, details of the successive state transition execution command are described with reference to the timing waveform charts shown in FIG. 13 through FIG. 16. FIG. 13 is a timing waveform chart when the successive state transition execution command "GoWAIT_CONNECTtoOP" is issued. When "GoWAIT_CONNECTtoOP" is set by the firmware (T0), the hardware circuit (the control circuit, the waitconnect, reset and operational state sequencers) executes the following state processes. FIG. 13 shows the case that the HS device is coupled.

Firstly, a state process that is equivalent to the "GoWAIT_CONNECT" shown in FIG. 8 is executed (T0). When the connection detection status (DetectCon) is issued as a result of the connection detection, an equivalent state process to that of "GoRESET" shown in FIG. 9 is conducted (T1). Next, the detection of the device chirp is carried out and the device chirp normal detection status (DetectDevChirpOK) is issued (T2). Subsequently, the reset complete status (ResetCmp) is issued and an equivalent state process to that of "GoOPERATIONAL" shown in FIG. 10 is executed (T3). The timing of the above mentioned processes is the same as the "GoWAIT_CONNECT", the "GoRESET" and the "GoOPERATIONAL" shown in FIG. 8 through FIG. 10.

Figure 14:
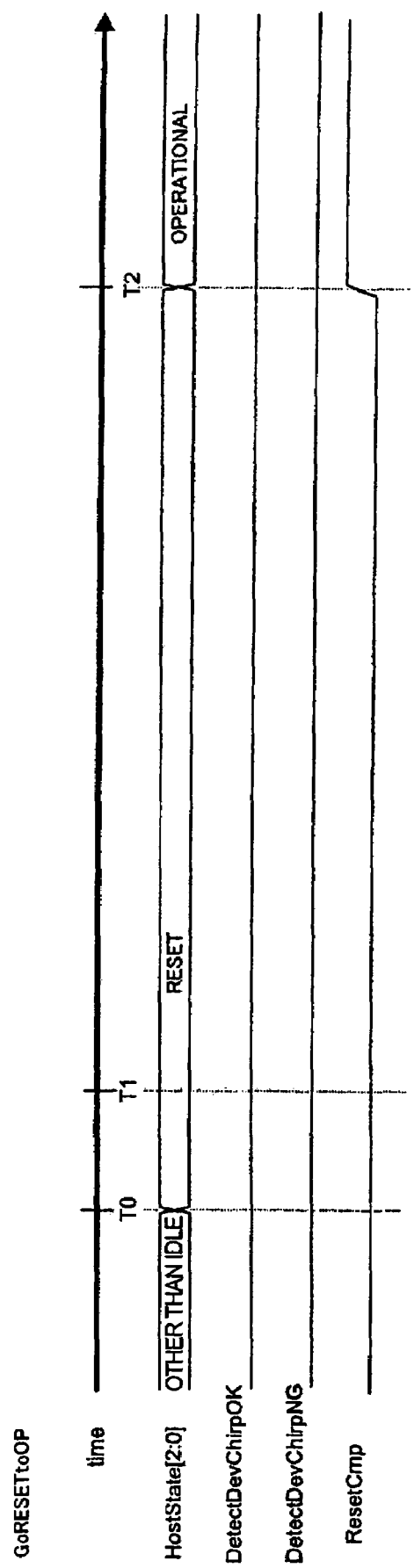
FIG. 14 is a timing waveform chart for explaining "GoRE-SETtoOP".

FIG. 14 is a timing waveform chart when the successive state transition execution command "GoRESETtoOP" is issued. When "GoRESETtoOP" is set by the firmware (T0), the hardware circuit (the control circuit, the reset and operational state sequencers) executes the following state processes. FIG. 14 shows the case that the HS device is coupled.

Firstly, a state process that is equivalent to the "GoRESET" shown in FIG. 9 is executed (T0). Next, the detection of the device chirp is carried out and the device chirp normal detection status (DetectDevChirpOK) is issued (T2). Subsequently, an equivalent state process to that of "GoOPERATIONAL" shown in FIG. 10 is executed when the reset complete status (ResetCmp) is issued (T2).

When the connection detection status (DetectCon) is issued as a result of the connection detection, an equivalent state process to that of "GoRESET" shown in FIG. 9 is conducted (T1). The timing of the above mentioned processes is the same as the "GoRESET" and the "GoOPERATIONAL" shown in FIG. 9 and FIG. 10.

Figure 15:
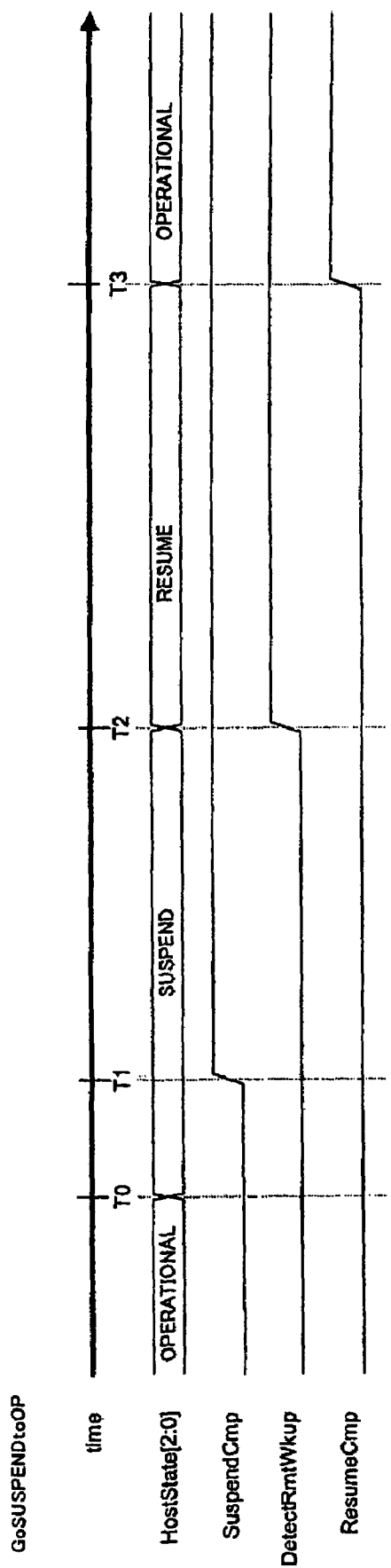
FIG. 15 is a timing waveform chart for explaining "GoS-USPENDtoOP".

FIG. 15 is a timing waveform chart when the successive state transition execution command "GoSUSPENDtoOP" is issued. When "GoSUSPENDtoOP" is set by the firmware (T0), the hardware circuit (the control circuit, the suspend, resume and operational state sequencers) executes the following state processes. At the same time, the remote wakeup detection permit (RmtWkupDetEnb) is automatically set to be in the enable state by the hardware.

Firstly, a state process that is equivalent to the "GoSUSPEND" shown in FIG. 9 is executed (T0). Then, the suspend transition complete status (SuspendCmp) is issued (T1). Next, the remote wakeup detection status (DetectRmtWkup) is issued when the remote wakeup signal is detected, and an equivalent state process to that of "GoRESUME" shown in FIG. 12 is executed. Subsequently, the equivalent state process to that of "GoOPERATIONAL" shown in FIG. 10 is executed when the resume complete status (ResumeCmp) is issued (T3).

FIG. 16 is a timing waveform chart when the successive state transition execution command "GoRESUMEtoOP" is issued. When "GoRESUMEtoOP" is set by the firmware (T0), the hardware circuit (the control circuit, the suspend, resume and operational state sequencers) executes the following state processes.

Firstly, a state process that is equivalent to the "GoRESUME" shown in FIG. 12 is executed (T0). Then, the equivalent state process to that of "GoOPERATIONAL" shown in FIG. 10 is executed when the resume complete status (ResumeCmp) is issued (T1).

According to the embodiment, when the firmware sets the successive state transition execution command, the plurality of the state processes are successively carried out as shown in FIG. 13 through FIG. 16. In each state process, various setting of the register, mode and signal and on-off setting of the various detection functions are automatically conducted by the hardware circuit as shown in FIG. 7 through FIG. 12. The counting process of the time period is also automatically carried out by the hardware circuit (the timer). When the state process (reset, resume) before the operational state is completed, the complete status (the complete interrupt) is sent to the firmware. This makes it possible for the firmware to start the data transfer in the operational state. In this way, the firmware does not have to issue the series of the plurality of the individual state transition execution commands but only has to issue the single successive state transition execution command according to the embodiment. Thereby, it is possible to further reduce the processing load of the firmware.

According to the individual state transition method shown in FIG. 7 through FIG. 12, for example, the firmware has to issue the individual state transition execution command "GoOPERATIONAL" in T10 shown in FIG. 9 after the firmware confirms the issue of the reset complete status "ResetCmp" in T9. In this case, the period T0-T11 in FIG. 9 is specified as a reset period in USB. Therefore, if the firmware issues the "GoOPERATIONAL" in late in T10, there is a possibility that it can not conform to the standard.

According to the successive state transition method shown in FIG. 13 through FIG. 16, for example, the control circuit 220 shown in FIG. 4 receives the reset complete status "ResetCmp" that is issued in T9 in FIG. 9. The control circuit 220 then outputs the activating signal "OperationalAct" to the operational state sequencer 234. This makes the state of the data transfer control device change into the operational state from the reset state automatically. Thereby, it is possible to comply with the USB standard during the reset periods in T1 through T11. Furthermore, the SOF packet can be appropriately outputted to the USB in T11. In other words, the firmware does not have to control the timing of the "GoOPERATIONAL" issue in T10. Therefore, it is possible to reduce the processing load of the firmware while complying with the standard.

Moreover, according to the embodiment, the state sequencers 231-236 in the state execution circuit 230 shown in FIG. 4 can independently conduct each state process of the individual state transition execution command, and the control circuit 220 controls these state sequencers. Therefore, it is possible to adopt both the individual state transition method shown in FIG. 7 through FIG. 12 and the successive state transition method shown in FIG. 13 through FIG. 16 without increasing the size of the circuit.

8. Configuration of Electronic Equipment

Figure 17A:
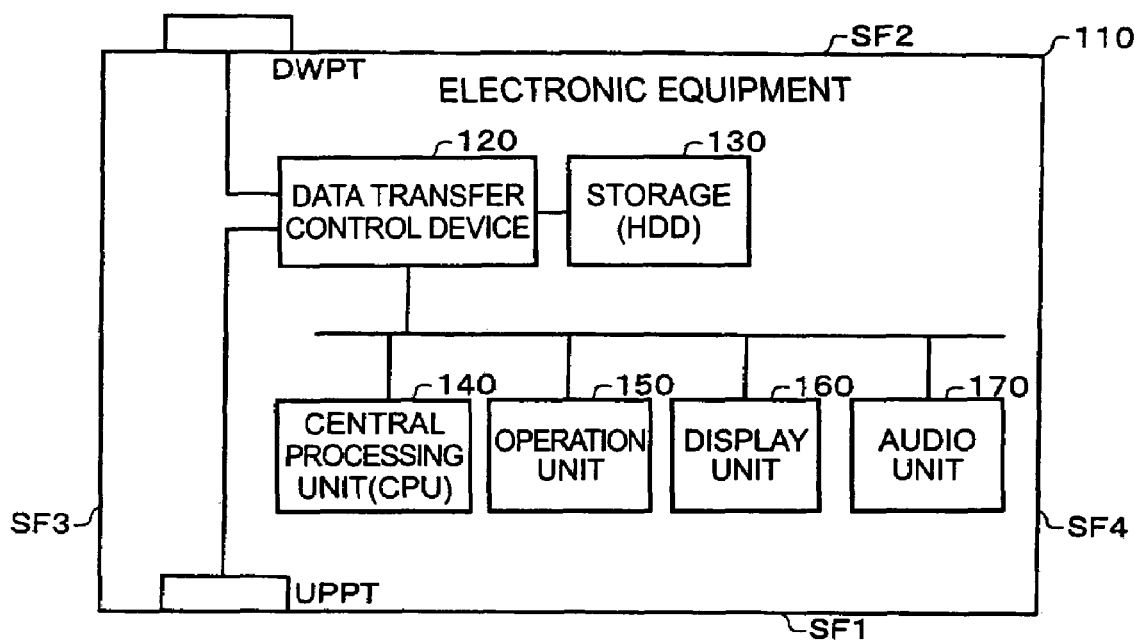
FIGS. 17A and 17B are configuration examples of electronic equipment according to the embodiment.
Figure 17B:
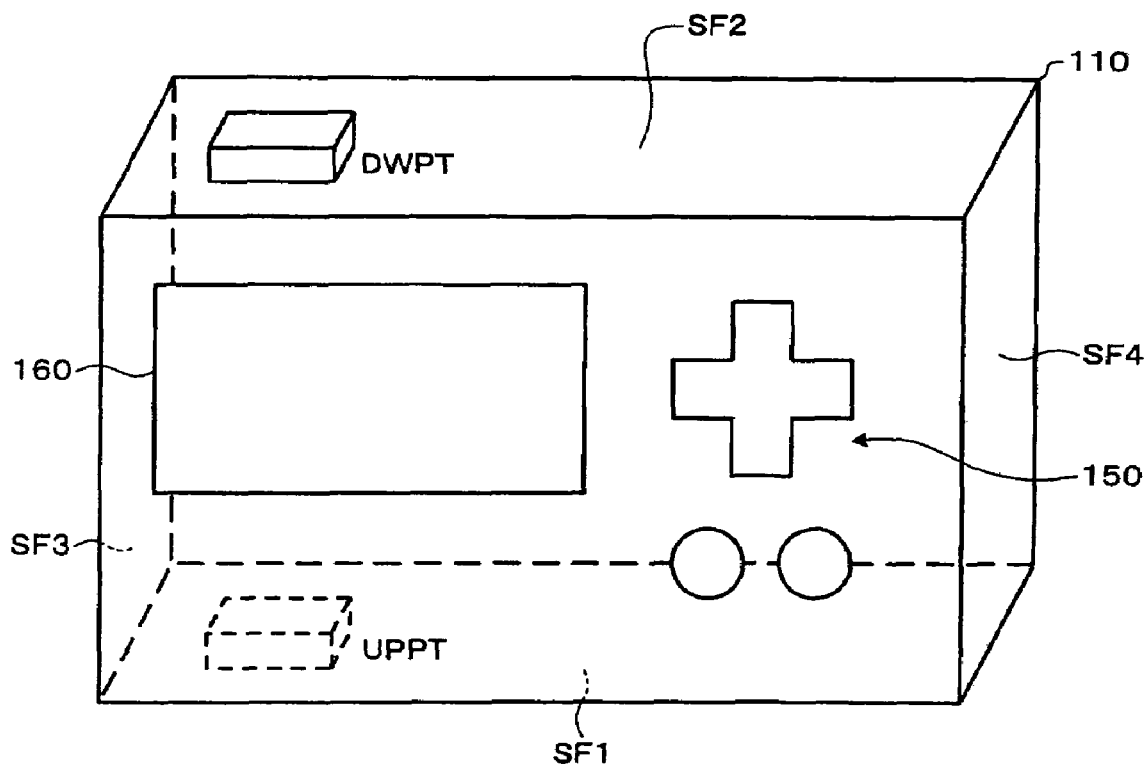

FIGS. 17A and 17B are configuration examples of electronic equipment having the data transfer control device according to the embodiment. An electronic equipment 110 includes the data transfer control device 120 described above with reference to FIG. 4 and FIG. 5. The electronic equipment 110 further includes the storage 130, the CPU 140 (the processing unit), an operation unit 150, a display unit 160 and an audio unit 170. The electronic equipment 110 also includes the upstream port UPPT and the downstream port DWPT. A part of the above-mentioned components may be omitted.

The upstream port UPPT is provided on a side face SF1 (a first side face, a first side) of the electronic equipment 110 as shown in FIGS. 17A and 17B. The downstream port DWPT is provided on a side face SF2 (a second side face, a second side) of the electronic equipment 110. The side face SF2 opposes to the side face SF1. More specifically, the downstream port DWPT is provided at the location (the position in the side face SF2) corresponding to the location (the position in the side face SF1) where the upstream port UPPT is provided. More specifically, the UPPT and the DWPT are axisymmetrically provided with reference to a centerline between a line (SF1 centerline) extending in a longitudinal direction along with the side face SF1 and a line (SF2 centerline) extending in a longitudinal direction along with the side face SF2.

The data transfer control device 120 is coupled to the upstream port UPPT and the downstream port DWPT, and controls the data transfer (the data transfer in the upstream direction) through the UPPT and the data transfer (the data transfer in the downstream direction) through the DWPT. To be more specific, the data transfer control device 120 carries out the data transfer through the UPPT in the device mode and through the DWPT in the host mode.

The storage 130 stores sound data (music data, voice data) and image data (still image data, picture data). A hard disk (HDD), a large-capacity memory (RAM), a optical disc and the like can be used as the storage 130.

The CPU 140 performs the control of the whole electronic equipment 110 and the like. The operation unit 150 is for the user to operate the electronic equipment 110. The display unit 160 (a liquid crystal display, an organic electroluminescence display) displays various images (a still image, a motion picture) to the user. The audio unit 170 (a speaker, a headphone terminal) is for outputting sounds such as music and voice.

For example, when the electronic equipment 110 is a mobile music player (an audio device), music data is downloaded from external electronic equipment (PC and the like) through the UPPT and DWPT and stored in the storage 130. The stored music data is read out and played from the storage 130, and then outputted to the user by the audio unit 170. When the electronic equipment 110 is a mobile image player, image data is downloaded from external electronic equipment through the UPPT and DWPT and stored in the storage 130. The stored image data is read out from the storage 130, and then displayed to the user by the display unit 160.

The foregoing description has been given by way of example only and it will be appreciated by a person skilled in the art that modifications can be made without departing from the scope of the invention. For example, words (bus, serial bus, transfer controller and the like) used in the specification and the figures may be replaced by comprehensive or synonymous terms and words (USB, host controller and the like) used in other section of the specification and the figures.

The configuration of the data transfer control device and the electronic equipment according to the invention is not limited to the configurations shown in FIG. 4, FIG. 5, FIG. 17A, FIG. 17B and the like, but a part of the components shown in the figures may be omitted or the connections may be modified. For example, the data transfer control device may only have the host function (a simplified host function) of the USB, or may conform to USB On-The-Go (OTG) standard.

The invention can be applied to various electronic equipments (mobile music players, mobile image players, cellular phones, mobile terminal devices, personal digital assistances, electronic dictionaries, electronic notebooks and the like).

Though the embodiment in which the invention is applied to the USB data transfer is described above, the invention can also be applied to other data transfers based on the standard that is based on the same scope of the invention or developed based on the equivalent idea of the invention.

The entire disclosure of Japanese Patent Application No. 2005-42118, filed February 18.

What is claimed is:

1. A data transfer control device for data transfer through a bus, comprising:

a state execution circuit conducting each state process of 1st through Nth states in order to perform a state control of the data transfer control device;

a transfer controller performing a control for the data transfer based on a result of the state process execution in the state execution circuit;

a command register in which a state transition execution command is set; and a control circuit decoding the state transition execution command set in the command register and controlling the state execution circuit based on a result of the decoding, the control circuit controlling the state execution circuit to execute a Kth ($1 \leq K \leq N$) state process if an individual state transition execution command that changes the state of the data transfer control device to the Kth state is set in the command register, and the control circuit controlling the state execution circuit to execute a plurality of state processes consecutively from a Lth ($1 \leq L < N$) state to a Mth ($L < M \leq N$) state if a successive transition execution command is set in the command register, the successive transition execution command successively changing the state of the data transfer control device from the Lth state to the Mth state.

2. The data transfer control device according to claim 1, wherein the state execution circuit includes 1st through Nth state sequencers executing the 1st through Nth state processes, the control circuit outputs an activating signal to start executing the state process to a Kth state sequencer if the individual state transition execution command is set in the command register, the Kth state sequencer conducts the Kth state process, the control circuit sequentially outputs the activating signal to each of Lth through Mth state sequencers in order to start the state process if the successive state transition execution command is set in the command register, the Lth through Mth state sequencers respectively conduct the Lth through Mth state processes, and the control circuit receives a completion signal of the state process execution from each state sequencer.

3. The data transfer control device according to claim 2, further comprising an interrupt signal generation circuit generating an interrupt signal to a processing unit that sets the state transition execution command in the command register, wherein the interrupt signal generation circuit receives the completion signal from each state sequencer and generates the interrupt signal based on the completion signal.

4. The data transfer control device according to claim 1, wherein the successive state transition execution command includes at least one of a first command that successively changes the state starting from a wait connect state to an operational state through a reset state and a second command that successively changes the state starting from the reset state to the operational state.

5. The data transfer control device according to claim 4, wherein the control circuit outputs the activating signal of the operational state process execution to the state execution circuit if the control circuit receives the completion signal of the reset state process execution from the state execution circuit.

6. The data transfer control device according to claim 1, wherein the successive state transition execution command includes at least one of a third command that successively changes the state starting from a suspend state to an operational state through a resume state and a forth command that successively changes the state starting from the resume state to the operational state.

7. The data transfer control device according to claim 6, wherein the control circuit outputs the activating signal of the operational state process execution to the state execution circuit if the control circuit receives the completion signal of the resume state process execution from the state execution circuit.

8. The data transfer control device according to claim 1, further comprising:

a line state detection circuit detecting a line state of a data line of the bus, wherein the line state detection circuit includes a plurality of detection circuits, the state execution circuit enables a detection circuit that should be operated for the detection among the plurality of the detection circuits, and outputs a signal that disables an unrequited detection circuit to the line state detection circuit.

9. The data transfer control device according to claim 1, wherein the transfer controller includes a transaction execution circuit executing a transaction process, the transaction execution circuit receives a transaction execution activating signal from the state execution circuit and starts to execute the transaction process according to the transaction execution activating signal.

10. The data transfer control device according to claim 1, further comprising a line state control circuit controlling a line state of a data line of the bus, the line state control circuit receiving a line state control signal from the state execution circuit and controlling the line state based on the line state control signal.

11. The data transfer control device according to claim 1, wherein the data transfer control device conducts data transfer through a universal serial bus (USB).

12. Electronic equipment, comprising
the data transfer control device according to claim 1; and
a storage storing data that is transferred by the data transfer control device.

13. A data transfer control device for data transfer through a bus, comprising:

a state execution circuit conducting each state process of 1st through Nth states in order to perform a state control of the data transfer control device;

a transfer controller performing a control for the data transfer based on a result of the state process execution in the state execution circuit;

a command register in which a state transition execution command is set; and a control circuit decoding the state transition execution command set in the command register and controlling the state execution circuit based on a result of the decoding, and the control circuit controlling the state execution circuit to execute a plurality of state processes consecutively from a Lth ($1 \leq L < M$) state to a Mth ($L < M \leq N$) state if a successive transition execution command is set in the command register, the successive transition execution command successively changing the state of the data transfer control device from the Lth state to the Mth state.

* * * * *